(12) United States Patent
Amin-Shahidi et al.

(10) Patent No.: US 10,976,824 B1
(45) Date of Patent: Apr. 13, 2021

(54) RELUCTANCE HAPTIC ENGINE FOR AN ELECTRONIC DEVICE

(71) Applicant: Apple Inc., Cupertino, CA (US)

(72) Inventors: Darya Amin-Shahidi, San Jose, CA (US); Alex M. Lee, Sunnyvale, CA (US); Denis G. Chen, San Jose, CA (US); Alex J. Lehmann, Sunnyvale, CA (US); Alex J. Speltz, San Francisco, CA (US); Etienne Marecal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,443

(22) Filed: Sep. 26, 2019

(51) Int. Cl.
*G06F 3/01* (2006.01)
*G05G 5/03* (2008.04)
(Continued)

(52) U.S. Cl.
CPC ............... *G06F 3/016* (2013.01); *G05G 5/03* (2013.01); *G06F 3/03547* (2013.01);
(Continued)

(58) Field of Classification Search
CPC .... G06F 3/04142; G06F 3/016; G06F 1/1616; G06F 1/169; G06F 3/03547; G06F 3/041; G06F 2203/04105; G06F 3/01; G06F 3/00; G06F 1/1615; G06F 1/1613; G06F 1/16; G06F 1/00; G06F 1/1688; G06F 1/1684; G06F 1/1637; G06F 3/0354; G06F 3/033; G06F 3/03; G06F 3/02; G06F 2203/041; G06F 2203/00; G06F 3/0414; G05G 1/02; G05G 5/803; G05G 2505/00; G05G 1/00; G05G 1/08; G05G 5/00; G05G 5/03

See application file for complete search history.

(56) References Cited

U.S. PATENT DOCUMENTS

| 4,121,049 | A | * | 10/1978 | Roeber | ................ G01G 3/1406 177/199 |
| 4,511,760 | A | * | 4/1985 | Garwin | ............... G06F 3/04142 178/18.03 |

(Continued)

FOREIGN PATENT DOCUMENTS

| CN | 1692371 | 11/2005 |
| CN | 102859618 | 1/2013 |

(Continued)

*Primary Examiner* — Julie Anne Watko
(74) *Attorney, Agent, or Firm* — Brownstein Hyatt Farber Schreck, LLP

(57) ABSTRACT

A reluctance haptic engine for an electronic device includes a core, an attractor, and one or more flexible support members. The core and/or the attractor may be coupled to an input structure, such as a button cap, trackpad cover, touchscreen cover, or the like. In an unactuated configuration, flexible support members maintain a gap between the core and the attractor. An electrical current may be applied to one or more conduction loops of the core to actuate the reluctance haptic engine and provide a haptic output by moving the input structure. The electrical current may cause a magnetic flux that results in a reluctance force that pulls the attractor and the core together and causes the input structure to move (e.g., translate, rotate, oscillate, vibrate, or deform) to produce a haptic output.

19 Claims, 17 Drawing Sheets

(51) Int. Cl.
*G06F 3/041* (2006.01)
*G06F 1/16* (2006.01)
*G06F 3/0354* (2013.01)
*G05G 1/02* (2006.01)

(52) U.S. Cl.
CPC ............... *G06F 3/041* (2013.01); *G05G 1/02* (2013.01); *G05G 2505/00* (2013.01); *G06F 1/169* (2013.01); *G06F 1/1616* (2013.01); *G06F 3/04142* (2019.05); *G06F 2203/04105* (2013.01)

(56) References Cited

U.S. PATENT DOCUMENTS

| | | | | |
|---|---|---|---|---|
| 5,038,142 A * | 8/1991 | Flower | ................ | G06F 3/0414 341/34 |
| 5,745,319 A * | 4/1998 | Takekado | ............ | G11B 5/4813 360/78.05 |
| 6,184,868 B1 | 2/2001 | Shahoian et al. | | |
| 6,262,868 B1 * | 7/2001 | Arya | .................... | G11B 5/4826 360/290 |
| 6,282,066 B1 * | 8/2001 | Bonin | ................ | G11B 5/5552 360/294.1 |
| 6,424,504 B1 * | 7/2002 | Abe | ...................... | B81B 3/0051 310/309 |
| 6,535,360 B1 * | 3/2003 | Kim | .................... | G11B 5/5552 360/294.3 |
| 6,600,634 B1 * | 7/2003 | Kim | .................... | G11B 5/5552 360/294.5 |
| 6,611,399 B1 * | 8/2003 | Mei | ...................... | G11B 5/5552 360/234.7 |
| 6,683,757 B1 * | 1/2004 | Bonin | ................ | G11B 5/5552 360/234.7 |
| 6,697,232 B1 * | 2/2004 | Hipwell, Jr. | ......... | G11B 5/4826 360/234.7 |
| 6,765,766 B2 * | 7/2004 | Hipwell, Jr. | ......... | G11B 5/5552 360/294.5 |
| 6,785,086 B1 * | 8/2004 | Bonin | ................ | G11B 5/5552 360/78.05 |
| 7,092,194 B2 * | 8/2006 | Meyer | .................... | G11B 5/596 360/75 |
| 7,158,122 B2 * | 1/2007 | Roberts | ............... | G06F 3/0414 178/18.02 |
| 7,248,442 B1 * | 7/2007 | Meyer | .................... | G11B 5/5552 360/294.3 |
| 7,369,369 B1 * | 5/2008 | Meyer | .................... | G11B 5/483 360/294.5 |
| 7,538,983 B1 * | 5/2009 | Meyer | .................... | G11B 5/4826 360/294 |
| 8,125,453 B2 | 2/2012 | Shahoian et al. | | |
| 9,213,409 B2 * | 12/2015 | Redelsheimer | ........ | G06F 3/0414 |
| 9,436,341 B2 * | 9/2016 | Ponziani | ................ | G06F 3/046 |
| 9,710,061 B2 | 7/2017 | Pance et al. | | |
| 9,928,950 B2 | 3/2018 | Lubinski et al. | | |
| 9,949,390 B1 * | 4/2018 | Doll | ....................... | H01F 7/064 |
| 10,146,309 B2 | 12/2018 | Tissot et al. | | |
| 10,232,714 B2 * | 3/2019 | Wachinger | ............. | H03K 17/98 |
| 10,497,172 B2 | 12/2019 | Bisbee et al. | | |
| 10,585,480 B1 * | 3/2020 | Bushnell | ............... | G06F 3/0202 |
| 10,599,223 B1 * | 3/2020 | Amin-Shahidi | ... | H03K 17/9625 |
| 10,698,489 B1 * | 6/2020 | Beyhs | ................... | G06F 3/0338 |
| 10,762,752 B1 * | 9/2020 | Persson | ................... | G08B 6/00 |
| 2005/0237314 A1 * | 10/2005 | Ryynanen | ............. | G06F 1/1613 345/184 |
| 2007/0069666 A1 * | 3/2007 | Van Eijk | ................. | H01J 37/20 318/135 |
| 2013/0257776 A1 * | 10/2013 | Tissot | ................. | H02K 33/16 345/173 |
| 2014/0218324 A1 * | 8/2014 | Tissot | ....................... | B06B 1/06 345/173 |
| 2015/0123500 A1 * | 5/2015 | Jung | ...................... | B06B 1/045 310/25 |
| 2015/0288193 A1 * | 10/2015 | Crosby | .................... | H02J 5/005 307/104 |
| 2018/0004293 A1 * | 1/2018 | Bella | ...................... | G06F 3/0414 |
| 2018/0081477 A1 * | 3/2018 | Picciotto | ............... | G06F 1/1681 |
| 2018/0085786 A1 * | 3/2018 | Songatikamas | ....... | H01F 7/1638 |
| 2018/0090253 A1 * | 3/2018 | Songatikamas | ....... | G06F 3/0416 |
| 2018/0364806 A1 * | 12/2018 | El-Ouardi | .............. | B60K 35/00 |
| 2018/0365466 A1 | 12/2018 | Shim et al. | | |
| 2018/0369865 A1 * | 12/2018 | Shoji | .................... | A63F 13/285 |
| 2020/0004337 A1 * | 1/2020 | Hendren | ................ | G06F 1/1671 |
| 2020/0103968 A1 * | 4/2020 | Amin-Shahidi | ....... | H02K 11/20 |

FOREIGN PATENT DOCUMENTS

| | | |
|---|---|---|
| CN | 104508596 | 4/2015 |
| CN | 205004230 | 1/2016 |
| CN | 107810123 | 3/2018 |
| CN | 108227937 | 6/2018 |
| WO | WO 15/047343 | 4/2015 |

* cited by examiner

RELUCTANCE HAPTIC ENGINE FOR AN ELECTRONIC DEVICE

FIELD

Embodiments relate generally to an electronic watch or other electronic device. More particularly, the described embodiments relate a reluctance actuator configured to provide a haptic output for an electronic device.

BACKGROUND

Some electronic devices are configured to provide haptic output to a user. In general, it may be advantageous to reduce the size of a haptic mechanism so that it occupies less space within an electronic device. Some traditional haptic output devices include motors and other relatively large actuation mechanisms, which occupy significant space within device enclosures. The extra space occupied by traditional haptic mechanisms could be eliminated to make the device smaller or used for other device components, such as batteries to provide longer device operation.

SUMMARY

Embodiments of the systems, devices, methods, and apparatuses described in the present disclosure are directed to reluctance actuators configured to provide haptic outputs at electronic devices.

Embodiments described herein may include or take the form of an electronic device that includes an enclosure, an input structure defining an input surface, a reluctance haptic engine positioned beneath the input surface, and a processing unit. The reluctance haptic engine may include an attractor and a core separated from the attractor by a gap in an unactuated configuration of the reluctance haptic engine. The core may comprise a conduction loop configured to receive an electrical current to generate a reluctance force that causes a transition from the unactuated configuration to an actuated configuration by reducing the gap between the attractor and the core. The reluctance haptic engine may further include a first flexible support member positioned on a first side of the core and coupled to the attractor and the core and a second flexible support member positioned on a second side of the core opposite the first side of the core. The first flexible support member and the second flexible support member may be configured to, in the unactuated configuration, maintain the gap between the core and the attractor and during the transition from the unactuated configuration to the actuated configuration of the reluctance haptic engine, deform as the gap between the attractor and the core is reduced. The processing unit may be configured to cause the electrical current to be applied to the conduction loop to produce a haptic output at the input surface.

Embodiments described herein may additionally or alternatively take the form of an electronic device that includes an enclosure, a display positioned at least partially within the enclosure, and a reluctance haptic engine positioned within the enclosure. The reluctance haptic engine may include a core that includes a conduction loop, and an attractor. The attractor may be configured to move toward the core in response to a reluctance force generated by an electrical current in the conduction loop and move away from the core in response to the electrical current in the conduction loop being ceased. The reluctance haptic engine may include a flexible support member coupling the attractor to the core and configured to provide a biasing force to maintain a gap between the attractor and the core in an absence of the electrical current in the conduction loop, deform to allow the attractor to move toward the core in response to the reluctance force generated by the electrical current in the conduction loop, and provide the biasing force to cause the attractor to move away from the core in response to the electrical current in the conduction loop being ceased. The attractor moving toward the core may produce a first portion of a haptic output along an external surface of the electronic device. The attractor moving away from the core may produce a second portion of the haptic output along the external surface of the electronic device.

Embodiments described herein may additionally or alternatively take the form of a method for producing a haptic output at an electronic device using a reluctance haptic engine with flexible support members. The method may include the steps of detecting an input at the electronic device and, in response to the input, determining, by a processing unit of the electronic device, an output to be produced by the electronic device. The method may further include the steps of outputting, by the processing unit, an output signal to provide a haptic output that corresponds to the determined output, and, in response to the output signal, applying an electrical current to a conduction loop of the reluctance haptic engine to generate a reluctance force to reduce a gap between an attractor and a core. The method may further include the step of reducing the electrical current to increase the gap between the attractor and the core using a flexible support member of the reluctance haptic engine. Reducing the gap may produce a first portion of the haptic output, and increasing the gap may produce a second portion of the haptic output.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
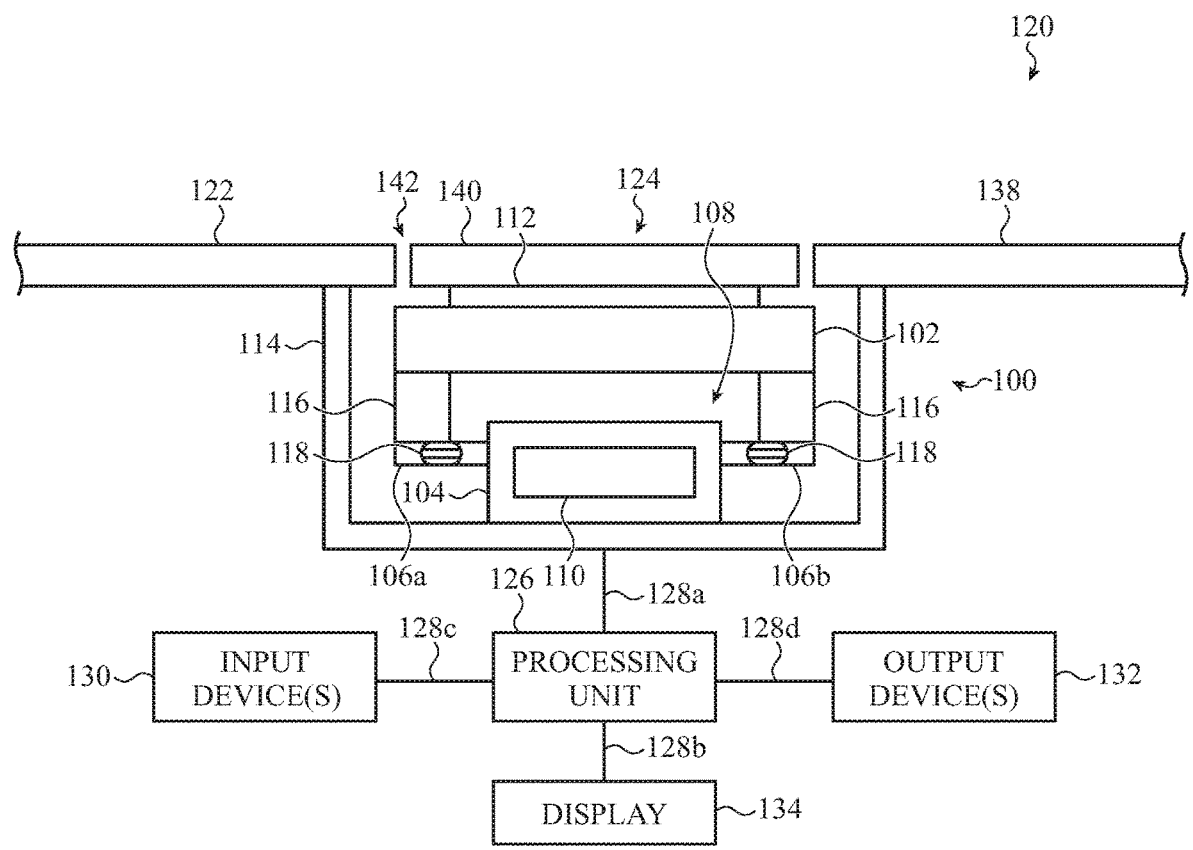
FIGS. 1A and 1B show functional block diagrams of an example electronic device that incorporates a reluctance haptic engine with flexible support members.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device having a reluctance haptic engine configured to provide haptic output to a user of the device. In various embodiments, the reluctance haptic engine includes a core and an attractor. The core and/or the attractor may be coupled to an input structure, such as a button cap, trackpad cover, touchscreen cover, or the like. In an unactuated configuration, flexible support members maintain a gap between the core and the attractor. An electrical current may be applied to one or more conduction loops of the core to actuate the reluctance haptic engine and provide a haptic output by moving the input structure. The electrical current may cause a magnetic flux resulting in a reluctance force that pulls the attractor and the core together and causes the input structure to move (e.g., translate, rotate, oscillate, vibrate, or deform) to produce a haptic output. In an actuated configuration, a biasing force applied by the flexible support members to maintain the gap may be overcome by the reluctance force, and the gap between the core and the attractor is reduced or closed.

The movement of the attractor and/or the core may result in deflection and/or deformation of one or more of the flexible support members. Said another way, the flexible support members may transition from a non-deformed state to a deformed state or from a deformed state to a further-deformed state under the applied reluctance force, resulting in and/or allowing the movement of the attractor toward the core. When the electrical currents applied to the one or more conduction loops are reduced or ceased, the biasing force of the flexible support members may overcome the reluctance force and cause the biasing members to transition from a deformed state to the non-deformed state (or from a deformed state to a less-deformed state), thereby separating the actuator and the core (e.g., moving the actuator away from the core) and/or reestablishing the gap.

As used herein, the terms "deform" or "deformation" may be used to refer to any change in shape or form of a component, including as a result of bending, torsion, tensile forces shear forces, compressive forces, or the like. As used herein, the terms "deflect" or "deflection" may refer to displacement of a component or a portion thereof from one position to another.

In some cases, the reluctance haptic engine may be used to detect inputs to the electronic device. The flexible support members may deflect or deform in response to a force applied to the input structure, for example by a user input. The flexible support members may include one or more sensing elements that may be used to sense inputs based on measuring deflection and/or deformation of the flexible support members. For example, the sensing elements may include one or more strain sensors positioned along the flexible support members and configured to output a signal that varies based on the deflection and/or deformation of the flexible support members.

In some cases, the signals provided by the sensing elements may be used to determine spatial parameters of the attractor, the core, and/or the input structure. The parameters may include, but are not limited to a position, displacement, velocity, and acceleration. The spatial parameters determined from the signals provided by the sensing elements may be used to determine a location and/or magnitude (e.g., force measurement) of an input to the input member. For example, a location and/or magnitude of an input may be determined by determining a difference between output signals of two or more sensing elements. The magnitude of one or more output signals may be used to estimate a magnitude of force applied to the input member.

A first flexible support member may be coupled to a first side of the core, and a second flexible support member may be coupled to a second side of the core that is opposite the first side. Positioning the flexible support members on opposite sides of the core may provide enhanced stability for the attractor and/or the core and may allow the sensing elements positioned along the flexible support members to more effectively be used to detect the locations and/or magnitudes of inputs and/or feedback related to haptic outputs.

As used herein, the terms "haptic output" and "tactile output" may refer to outputs produced by the electronic device that may be perceived through user touch. Examples of haptic outputs include vibrations, deflections, and other movements of a device enclosure, a device cover, or input device, or another device component that forms an input surface of the electronic device. In some cases, a reluctance haptic engine may vibrate, displace, and/or deflect a device component (e.g., an enclosure, a cover, or an input device) to produce a haptic output at an external surface of the device defined by the device component. In some cases, haptic outputs may be produced by relative movement of one or more device components with respect to one or more additional device components. As one example, a reluctance haptic engine may cause a first device component (for example, a cover) to vibrate, oscillate, rotate and/or translate relative to another device component (for example, an enclosure) to produce a haptic output that may be perceived by a user.

In some cases, the reluctance haptic engine is coupled to an enclosure of the electronic device and provides haptic outputs that may be tactilely perceived by the user along one or more portions of an external surface (such as an input or output surface) of the electronic device. In some cases, the reluctance haptic engine is coupled to a contact member that moves (e.g., oscillates, vibrates, translates or rotates) with respect to other components of the electronic device, such as a housing member, to provide haptic outputs. Translation may include inward and outward translation, lateral translation, and other movement of the contact member. In some cases, the reluctance haptic engine provides haptic outputs by deflecting a portion of an enclosure of the electronic device. Different types of movement may be used to provide different haptic outputs.

In some cases, the haptic outputs described herein are localized haptic outputs. As used herein, the term "localized haptic output" may be used to refer to a haptic output that is outputted through or at a particular location or region along a particular external surface of the electronic device, such as at an input surface or a portion thereof, while being imperceptible or absent from other external surfaces (or another portion of the particular external surface). The reluctance haptic engines described herein may produce localized haptic outputs causing vibration, deflection, or movement at particular locations or regions of the external surfaces of the electronic device. In some cases, a localized haptic output may be felt strongly at one or more locations or regions of the external surfaces and may be imperceptible or less perceptible at one or more other locations or regions of the external surfaces of the electronic device.

In some cases, localized haptic outputs may provide feedback regarding inputs received at particular locations of the electronic device. For example, localized haptic outputs may be provided at and/or near an input device (e.g., a button, a key, a crown, a trackpad, or a touchscreen) to provide feedback related to an input provided at the input device. In other cases, localized haptic outputs may provide other types of feedback or information to users.

In some cases, the haptic outputs described herein are global haptic outputs. As used herein, the term "global haptic output" may refer to a haptic output that is produced in a large area and, in some cases, across or through substantially all of the external surfaces of the electronic device. As described herein, a reluctance haptic engine may cause a mass or weighted member to move and, in some cases, oscillate, to produce a perceptible vibration or tactile effect along the external surfaces of the electronic device. In general, global haptic outputs are not meant to be localized to any particular location or region of the external surfaces of the electronic device. In some cases, global haptic outputs may provide feedback that is not related to a specific location on the electronic device. For example, global haptic outputs may be provided for alerts received at the electronic device. In other cases, global haptic outputs may provide other types of feedback or information to users.

The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" or "electrically coupled" may be used to refer to two or more devices that are coupled in any suitable manner for operation and/or communication, including wiredly, wirelessly, or some combination thereof.

These and other embodiments are discussed with reference to FIGS. 1A-8. However, those skilled in the art will readily appreciate that the detailed description given herein with respect to these figures is for explanatory purposes only and should not be construed as limiting.

Figure 1B:
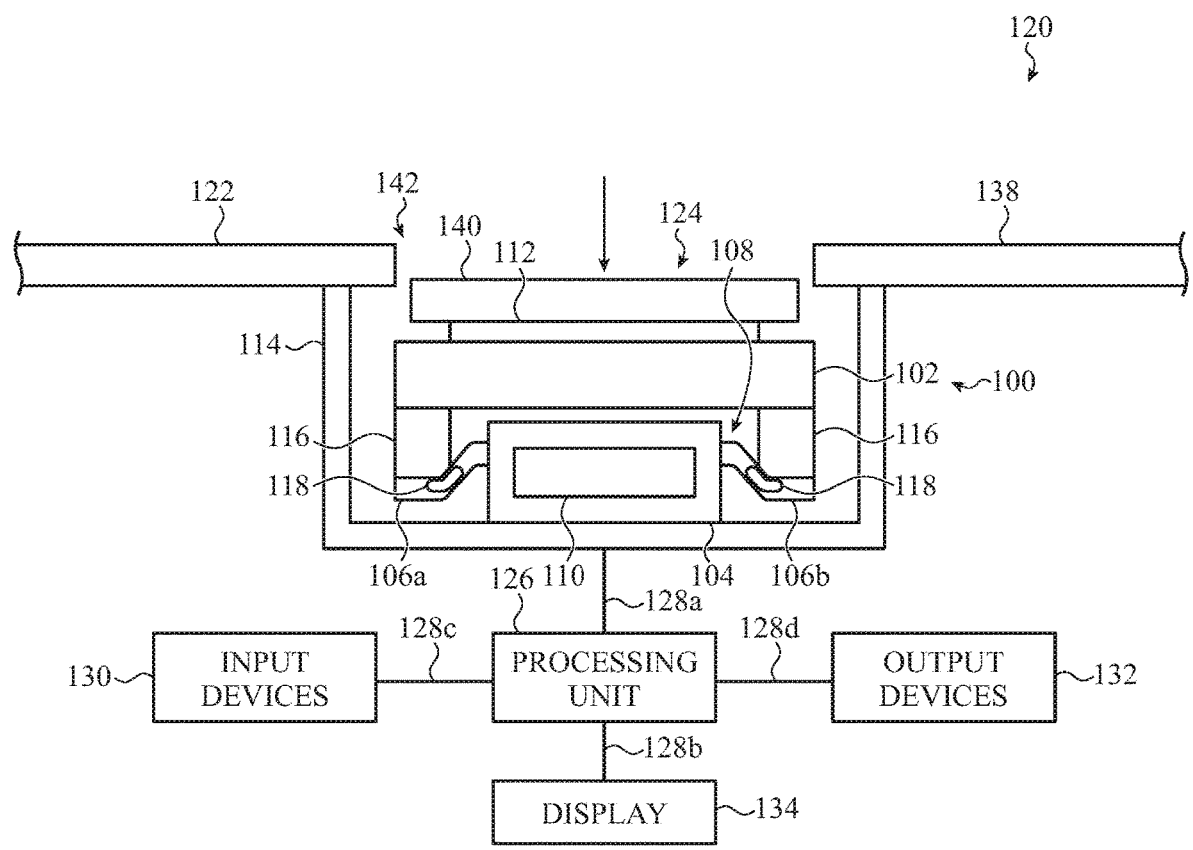

FIGS. 1A and 1B show functional block diagrams of an example electronic device 120 that incorporates a reluctance haptic engine with flexible support members. The electronic device 120 may include a device enclosure 122, a reluctance haptic engine 100, one or more input devices 130, one or more output devices 132, a display 134, and a processing unit 126 positioned at least partially within the enclosure 122.

The reluctance haptic engine 100 may be positioned at least partially within the enclosure 122 of the electronic device 120 and may be configured to provide haptic outputs along an external surface (e.g., an input surface 124) of the electronic device 120. In various embodiments, the reluctance haptic engine 100 may provide localized haptic outputs at particular locations or regions of the external surfaces of the electronic device 120. In some cases, the reluctance haptic engine 100 may provide global haptic outputs along the external surfaces of the electronic device.

In some cases, as shown in FIGS. 1A and 1B, the reluctance haptic engine 100 may be positioned beneath and/or coupled to an input structure 140 that defines an input surface 124 of the electronic device 120. The input structure 140 may be a portion of a device housing or cover, such as a top case of a laptop computer. In some cases, the input structure 140 is at least a portion of an input device 130, such as a button, crown, trackpad, key, or the like. For example, the input structure 140 may be a button cap, a keycap, a trackpad cover, a crown body, or the like. In some cases, the input structure 140 is a cover positioned over a display, such as a touchscreen display. In some cases, the input structure 140 is a portion of the enclosure 122 of the electronic device 120 and is continuous with one or more additional portions of the enclosure. Inputs received at the input surface 124 and/or haptic outputs provided at the input surface 124 by the reluctance haptic engine 100 may cause the input structure 140 or portions thereof to deform or deflect with respect to other portions of the input structure 140 and/or other portions of the components defining the external surfaces of the electronic device.

In some cases, the input structure 140 may be a separate component from one or more other portions of the enclosure 122 of the electronic device 120, such as a housing member 138. In some cases, the housing member 138 and the input structure 140 cooperate to define at least part of the external surfaces of the electronic device 120. In some cases, the input structure 140 is positioned in an opening 142 defined by the housing member 138. The input structure 140 may be configured to move (e.g., rotate, translate, or the like) relative to one or more additional components of the electronic device 120, such as the housing member 138. For example, the input structure 140 may be configured to translate inward and outward (e.g., up and down with respect to FIGS. 1A and 1B) with respect to the housing member 138. Inputs received at the input surface 124 and/or haptic outputs provided at the input surface 124 by the reluctance haptic engine 100 may cause the input structure 140 or portions thereof to move (e.g., translate, rotate, or the like), deform, or deflect with respect to other portions of the input structure and/or other portions of the components defining the external surfaces of the electronic device.

In some cases, the reluctance haptic engine 100 is positioned beneath a structure that is not a portion of an input device (e.g., a portion of the enclosure 122) and/or the reluctance haptic engine 100 provides haptic outputs at one or more surfaces that are not input surfaces.

The reluctance haptic engine 100 may include an attractor 102 and a core 104. The attractor 102 may be coupled to the core 104 by one or more flexible support members 106a, 106b (individually and collectively referred to herein as flexible support members 106l. The flexible support members 106a, 106b may be formed of a compliant or bendable material that allows the relative movement between the attractor 102 and the core 104. FIG. 1A shows the reluctance haptic engine 100 in an unactuated configuration in which the attractor 102 and the core 104 are spaced apart by a gap 108. In some cases, the flexible support members 106 may provide a biasing force to maintain the gap between the attractor 102 and the core 104 (e.g., in the absence of an electrical current in the conduction loops 110). The reluctance haptic engine 100 may include one or more spacers (e.g., spacers 116) between the flexible support members 106 and the attractor 102 and/or the core 104 that help to define the gap 108. FIG. 1B shows the reluctance haptic engine 100 in an actuated configuration in which the gap 108 between the attractor 102 and the core 104 is reduced or eliminated. The reluctance haptic engine 100 may actuate (e.g., transition from an unactuated configuration to an actuated configuration) in response to a reluctance force generated within the reluctance haptic engine; this reluctance force may be generated in response to a force applied to the reluctance haptic engine, such as by a user input on the input surface 124 of the input structure 140.

The core 104 may include one or more conduction loops 110 (e.g., electromagnetic coils, electrically conductive coils, wire loops, other electrically conductive materials, and the like). Electrical currents (e.g., alternating current, electromagnetic signals, drive signals, and the like) induced in the conduction loops 110 may generate magnetic flux. The magnetic flux passing through the attractor 102 and/or the core 104 causes a reluctance force that results in attraction between the attractor 102 and the core 104. As illustrated in FIG. 1B, the attraction may result in displacement of the attractor 102 toward the core 104, reducing or closing the gap 108 and thereby displacing at least a portion of the input surface 124 towards the core to produce the haptic output. Actuation of the reluctance haptic engine 100 may produce a haptic output or a portion thereof. The haptic output may be localized along at least a portion of the input structure 140 and/or a global haptic output along a larger portion or a substantial entirety of the enclosure 122.

As shown in FIG. 1B, actuation of the reluctance haptic engine 100 may be accompanied by deformation of one or more of the flexible support members 106. During the transition from the unactuated configuration to the actuated configuration of the reluctance haptic engine 100, the flexible support members 106a, 106b may deform as the gap between the attractor 102 and the core 104 is reduced. Said another way, the flexible support member 106 may transition from a non-deformed state (e.g., as shown in FIG. 1A) to a deformed state (e.g., as shown in FIG. 1B), or from a deformed state to a further-deformed state, as a result of the applied reluctance force, in accordance with the displacement of the attractor 102 toward the core 104. When the reluctance force is reduced or ceases (e.g., when the electrical currents applied to the conduction loops 110 are reduced or ceased) or when the input force is reduced or ceased, the biasing force of the flexible support members 106 may overcome the reluctance force and/or the input force and cause the biasing members to transition from a deformed state to the non-deformed state (or from a deformed state to a less-deformed state), thereby displacing the attractor 102 away from the core 104 and/or reestablishing the gap 108. Displacing the attractor 102 away from the core 104 may produce a haptic output or a portion thereof.

The attractor 102 may be attached or otherwise coupled to a component (e.g., the input structure 140) defining the input surface 124 of the electronic device 120. In some cases, the attractor 102 is the input structure 140. The core 104 may be fixed with respect to the enclosure 122 such that the core does not move with respect to the enclosure 122. The core 104 may be attached or otherwise coupled to a frame 114 that is fixed with respect the enclosure 122 (e.g., housing member 138) the attractor 102 moves relative to the core 104, the frame 114, and/or the housing member 138. The displacement of the attractor 102 may cause a corresponding movement and/or deformation of the portion of the input surface 124 defined by the input structure 140. For example, as shown in FIG. 1B, the input surface 124 may be displaced downward, or toward the core 104, as the attractor 102 moves toward the core. In some cases, the reluctance haptic engine 100 is coupled to the input structure 140 by one or more connection elements 112. The connection elements 112 may transfer motion from the reluctance haptic engine 100 to the input structure 140, thereby producing a haptic output along, or, or through the input surface 124.

In various embodiments, the positions of the attractor 102 and the core 104 may be reversed from what is shown in FIGS. 1A and 1B. For example, the attractor 102 may be attached or otherwise coupled to the frame 114 and the core may be attached or otherwise coupled to the input structure 140, such that movement of the core 104 relative to the attractor 102, the frame 114, and/or the housing member 138 causes a corresponding displacement and/or deformation of the portion of the input surface 124 defined by the input structure 140. As such, while the examples described herein describe displacement of the attractor 102, they are meant to encompass examples in which the core 104 is displaced.

The reluctance haptic engine 100 may provide a haptic output by deflecting or deforming a portion of the enclosure 122. For example, the reluctance haptic engine 100 may deflect or displace a portion of the enclosure 122 inward and/or outward to provide a haptic output at the input surface 124. Deflection or other movement of the enclosure 122 against a user's skin may produce a haptic output can be perceived by the user.

The reluctance haptic engine 100 may provide a haptic output by oscillating, vibrating, translating and/or rotating a component of the electronic device 120 relative to other components of the electronic device 120. For example, the reluctance haptic engine 100 may cause the input structure 140 to move relative to one or more other portions of the enclosure 122 of the electronic device 120. The movement of the input structure 140 may be inward, (e.g., downward with respect to FIGS. 1A and 1B), outward (e.g., upward with respect to FIGS. 1A and 1B), lateral (e.g., left-to-right and/or right-to-left with respect to FIGS. 1A and 1B), vibratory, oscillating, or some combination thereof. In some cases, the haptic output provided by the reluctance haptic engine 100 corresponds to an input received at the input structure 140. For example, in response to an inward force applied to the input structure 140 (e.g., downward with respect to FIG. 1B), the reluctance haptic engine 100 may produce a haptic output that moves the input structure 140 inward to accompany the inward force.

In some cases, the reluctance haptic engine 100 may provide a global haptic output by moving a mass or weighted member within the enclosure. The reluctance haptic engine 100 may cause the mass or weighted member to move and, in some cases, oscillate, to produce a perceptible vibration or tactile effect along an external surface of the electronic device 120.

The attractor 102 may be or include a permanent magnet (e.g., formed of or including a magnetic material), an electromagnet, or it may be or include a ferromagnetic element (e.g., formed of or including ferromagnetic material) that does not produce a magnetic field absent the influence of another magnetic field. Example magnetic materials include, but are not limited to, magnetized iron, nickel, and/or cobalt alloys (e.g., steel), ferrite, or other suitable materials. Example ferromagnetic materials include, but are not limited to, unmagnetized iron, nickel, and/or cobalt alloys (e.g., steel), ferrite, or other suitable materials. In some cases, the attractor 102 is formed of or includes an iron-cobalt alloy with equal parts iron and cobalt (e.g., FeCo50). The type of material used for the attractor 102 may depend on various factors, such as the particular electromagnetic interaction that the haptic output system uses to produce the haptic output.

The core 104 may be or include any suitable material or combination of materials, including metal, plastic, composites, ceramics, and the like. The core 104 may be or include a permanent magnet, or it may be or include a ferromagnetic element that does not produce a magnetic field absent the influence of another magnetic field. In some cases, the core 104 is formed of or includes an iron-cobalt alloy with equal parts iron and cobalt (e.g., FeCo50). In some cases, the core 104 is formed of or includes stainless steel, such as grade 430 stainless steel. The type of material used for the core 104 may depend on various factors, such as the particular electromagnetic interaction that the haptic output system uses to produce the haptic output.

The reluctance haptic engine 100 may produce haptic outputs in response to receiving one or more signals from the processing unit 126. In some cases, the haptic outputs may correspond to inputs received by the electronic device 120 and/or outputs provided by the electronic device. The haptic outputs may correspond to operational states, events, or other conditions at the electronic device 120, including inputs received at the electronic device (e.g., touch inputs, rotational inputs, translational inputs), outputs of the electronic device (e.g., graphical outputs, audio outputs, haptic outputs), applications and processes executing on the electronic device, predetermined sequences, user interface commands (e.g., volume, zoom, or brightness controls, audio or video controls, scrolling on a list or page, and the like), and the like. The reluctance haptic engine 100 may be operably coupled to the processing unit 126 via a connector 128a and/or via one or more additional components of the electronic device 120. In some cases, the reluctance haptic engine 100 may produce audio outputs in addition to or as an alternative to producing haptic outputs. For example, actuation of the reluctance haptic engine 100 may produce a sound. Audio outputs may be produced in response to any of the conditions, inputs, or the like discussed above with respect to haptic outputs. In some cases, audio outputs and haptic outputs are produced by the same actuation or actuations of the reluctance haptic engine 100.

As noted above, the reluctance haptic engine 100 may actuate (e.g., transition from an unactuated configuration to an actuated configuration) in response to a reluctance force generated within the reluctance haptic engine and/or in response to a force applied to the reluctance haptic engine, such as by a user input on the input structure 140. In some cases, the reluctance haptic engine may include sensing elements that may be used to determine whether and to what degree the haptic device has been actuated, either by an input or a reluctance force.

Still with respect to FIG. 1B, the flexible support members 106a, 106b may include one or more sensing elements 118 that may be used to sense actuation based on measuring deflection and/or deformation of the flexible support members 106a, 106b. As noted above, the flexible support members 106a, 106b may deflect or deform in response to actuation of the reluctance haptic engine, for example by a user input and/or a reluctance force. The sensing elements 118 may include one or more sensors (e.g., strain sensors) positioned along the flexible support members 106a, 106b and configured to output a signal that varies based on the deflection and/or deformation of the flexible support members. Additionally or alternatively, other types of sensing elements may be used for sensing actuation. As one example, the reluctance haptic engine 100 may include one or more capacitive sensors. A first capacitive electrode may be positioned on the attractor 102 and a second capacitive electrode may be positioned on the core 104, and a change in a capacitance between the two electrodes may be used to determine the relative position of the core and the attractor. Similarly, a first capacitive electrode may be positioned on a flexible support member 106a, 106b, and a second capacitive electrode may be positioned on the frame 114.

In some cases, the signals provided by the sensing elements 118 may be used to determine spatial parameters of the attractor 102, the core 104, the flexible support members 106a, 106b, and/or the input structure 140. The spatial parameters may include, but are not limited to a position, displacement, velocity, and acceleration. The spatial parameters determined from the signals provided by the sensing elements 118 may be used to determine a location and/or magnitude (e.g., force measurement) of an input to the input structure 140. For example, a location of an input may be determined by determining a difference between output signals of two or more sensing elements 118. The magnitude of one or more output signals may be used to estimate a magnitude of force applied to the input structure 140.

In some cases, the processing unit 126 may analyze detected changes in inductance between the attractor and the core to detect inputs. In some embodiments an isolated inductive sensing coil may be positioned on the frame 114 and may be used to detect inputs by detecting a change in an air gap between the frame 114 and the flexible support member(s) 106a and/or 106b. Additionally or alternatively, an isolated inductive sensing coil may be positioned on or otherwise coupled to a flexible support member 106a and/or 106b, and may be used to detect inputs by detecting a change in an air gap between the flexible support member(s) 106a and/or 106b and the frame 114.

In some cases, in response to detecting an input to the input structure 140, the processing unit 126 causes the reluctance haptic engine 100 to produce a haptic output. For example, in response to receiving an inward (e.g., downward with respect to FIGS. 1A and 1B) press on the input structure 140, the reluctance haptic engine 100 may produce a haptic output by generating a reluctance force that applies a further inward force on the input structure 140 to accentuate the user input.

In some cases, the signals provided by the sensing elements 118 may be used to determine characteristics of haptic outputs provided by the reluctance haptic engine 100. Characteristics of the haptic outputs may include a strength of the haptic output, a frequency of movement associated with the haptic output, or the like. The processing unit 126 may determine the haptic output characteristics by using the signals provided by the sensing elements 118 to determine spatial parameters of the attractor 102, the core 104, the flexible support members 106a, 106b and/or the input structure 140 caused by a reluctance force. The processing unit 126 may use the determined spatial parameters and/or haptic output characteristics to adjust the haptic outputs by changing signal characteristics (e.g., frequency, amplitude, waveform, etc.) of the electrical current provided to the conduction loops 110.

A first flexible support member 106 may be coupled to a first side of the core 104, and a second flexible support member 106 may be coupled to a second side of the core 104 that is opposite the first side, as shown in FIG. 1A. Positioning the flexible support members 106 on opposite sides of the core may provide enhanced stability for the attractor 102 and/or the core 104 and may allow the sensing elements 118 positioned along the flexible support members to more effectively be used to detect the locations and/or magnitudes of inputs and/or feedback related to haptic outputs.

The flexible support members 106a, 106b may be formed of any suitable material or combination of materials, including metal, plastic, composites, ceramics, and the like. The flexible support members 106a, 106b may be formed of a compliant or bendable material that allows the relative movement between the attractor 102 and the core 104. In some cases, the flexible support members 106a, 106b are formed of stainless steel, such as grade 301 stainless steel. The spacers 116 may be formed of any suitable material or combination of materials, including metal, plastic, composites, ceramics, and the like. In some cases, the spacers 116 are formed of stainless steel, such as grade 301 stainless steel. The frame 114 may be formed of any suitable material or combination of materials, including metal, plastic, composites, ceramics, and the like. In some cases, the frame 114 is formed of stainless steel, such as grade 316 stainless steel. In various embodiments, the spacers 116 and/or the frame 114 may be omitted from the reluctance haptic engine 100. For example, the flexible support members 106a, 106b may be directly attached to the attractor 102 and/or the core 104, or the attractor 102 and/or the core 104 may be directly attached to the enclosure 122 (or coupled to the enclosure via one or more additional components of the electronic device 120).

In various embodiments, the display 134 may be positioned at least partially within the enclosure 122. The display 134 provides a graphical output, for example associated with an operating system, user interface, and/or applications of the electronic device 120. In one embodiment, the display 134 includes one or more sensors and is configured as a touch-sensitive (e.g., single-touch, multi-touch) and/or force-sensitive display to receive inputs from a user. The display 134 is operably coupled to the processing unit 126 of the electronic device 120, for example by a connector 128b. In some cases, the graphical output of the display 134 is visible along at least a portion of an external surface of the electronic device 120.

In various embodiments, a graphical output of the display 134 is responsive to inputs provided at the display and one or more additional input devices 130. For example, the processing unit 126 may be configured to modify the graphical output of the display 134 in response to determining an electrocardiogram, receiving rotational inputs, receiving translational inputs, or receiving touch inputs. In some cases, a haptic output provided by the reluctance haptic engine 100 corresponds to the graphical output of the display 134. In some cases, the reluctance haptic engine 100 may produce a haptic output that is coordinated with a change in the graphical output of the display 134. For example, the haptic output may be produced at or near the same time as the change in the graphical output of the display 134. In some cases, a time that the haptic output is produced overlaps a time that the graphical output of the display 134 changes.

The display 134 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 134 is positioned beneath and viewable through the cover.

Broadly, the input devices 130 may detect various types of input, and the output devices 132 may provide various types of output. The input structure 140, either alone or in combination with the reluctance haptic engine 100 may be an example of an input device 130. Similarly, the input structure 140, either alone or in combination with the reluctance haptic engine 100 may be an example of an output device 132. The processing unit 126 may be operably coupled to the input devices 130 and the output devices 132, for example by connectors 128c and 128d. The processing unit 126 may receive input signals from the input devices 130, in response to inputs detected by the input devices. The processing unit 126 may interpret input signals received from one or more of the input devices 130 and transmit output signals to one or more of the output devices 132. The output signals may cause the output devices 132 to provide one or more outputs. Detected input at one or more of the input devices 130 may be used to control one or more functions of the electronic device 120. In some cases, one or more of the output devices 132 may be configured to provide outputs that are dependent on, or manipulated in response to, the input detected by one or more of the input devices 130. The outputs provided by one or more of the output devices 132 may also be responsive to, or initiated by, a program or application executed by the processing unit 126 and/or an associated companion device. In some cases, the output devices 132 may include a speaker, and the processing unit 126 may cause the speaker to produce an audio output in conjunction with a haptic output provided using the reluctance haptic engine 100. Examples of suitable processing units, input devices, output devices, and displays, are discussed in more detail below with respect to FIG. 10.

Figure 2A:
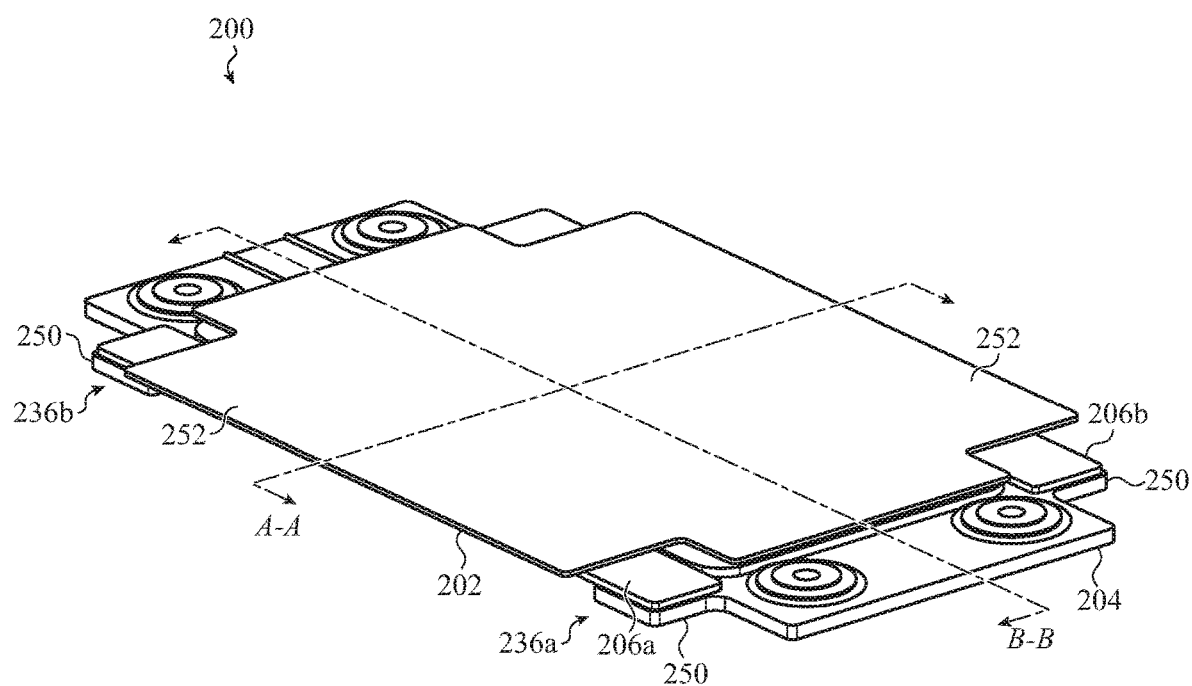
FIG. 2A illustrates an example reluctance haptic engine that includes an attractor, a core, and flexible support members configured to define a gap between the attractor and the core and allow movement between the attractor and the core.
Figure 2B:
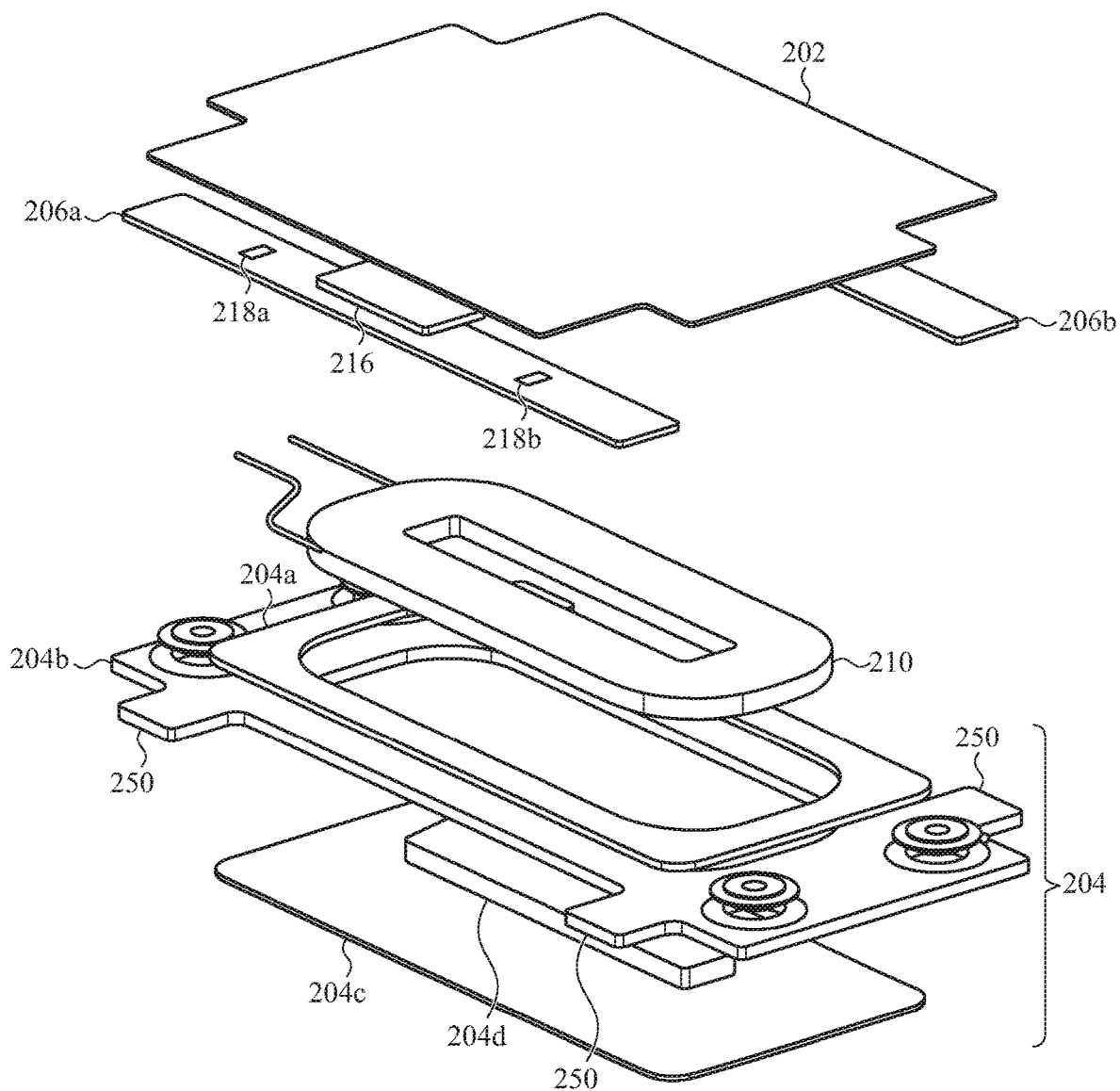
FIG. 2B shows an exploded view of the various components of the reluctance haptic engine of FIG. 2A.

FIG. 2A illustrates an example reluctance haptic engine 200 that includes an attractor 202, a core 204, and flexible support members 206a, 206b configured to define a gap between the attractor and the core and allow movement between the attractor and the core. FIG. 2B shows an exploded view of the various components of the reluctance haptic engine 200. The core 204 may include multiple layered components. For example, the core may include layered components 204a, 204b, 204c, and 204d. The layered construction of the core 204 may simplify manufacturing by allowing the components to be stamped and subsequently attached or coupled together. This may provide advantages over molding, machining, or other manufacturing techniques.

As the attractor 202 is depressed, whether by a reluctance force caused by electrical currents in the conduction loops 210, a force applied to the attractor 202 (e.g., by a user input), or some combination thereof, the flexible support members 206a, 206b deform to allow the attractor 202 to move relative to the core 204, as shown and described in more detail below with respect to FIGS. 2D and 2E.

As shown in FIG. 2B, the core 204 may include tabs 250 extending from opposing sides of the core. The tabs 250 may be configured to be attached or otherwise coupled to opposing ends of the flexible support members 206a, 206b. For example, a first end portion 236a of the flexible support member 206a may be attached to a first tab 250, and a second end portion 236b of the flexible support member 206b opposite the first end portion 236a may be attached to a second tab 250. The flexible support member 206a may extend between the first and second tabs 250. The flexible support member 206b may be similarly positioned with respect to third and fourth tabs 250 extending from an opposite side of the core 204. A middle portion of each flexible support member 206a, 206b between the end portions of the flexible support member may deform as the gap between the attractor and the core is reduced.

The flexible support members 206a, 206b extend between tabs of the core 204 and may allow the central portion of the flexible support members 206a, 206b to deform or deflect. This, in turn, allows relative movement of the attractor 202 with respect to the core 204. In some cases, the reluctance haptic engine 200 includes one or more spacers that couple the attractor 202 to the flexible support members 206a, 206b. A spacer 216 may be positioned between the attractor 202 and each flexible support member 206a, 206b to transfer force from the attractor 202 to the flexible support members. The spacer 216 may be positioned between the end portions 236a, 236b of the flexible support members 206a, 206b. In some cases, the spacer 216 concentrates forces applied to the attractor 202 to a central portion of each flexible support member 206a, 206b so that the bending of the flexible support members is constrained along less of its length.

Two tabs 250 may extend from a first side of the core 204 and two tabs 250 may extend from a second side of the core opposite the first side. In various embodiments the core 204 may include more or fewer tabs 250. A first flexible support member 206a may be coupled to the tabs 250 extending from the first side of the core 204, and a second flexible support member 206b may be coupled to the tabs 250 extending from the second side of the core 204 that is opposite the first side, as shown in FIGS. 2A and 2B.

Positioning the flexible support members 206a, 206b on opposite sides of the core may provide enhanced stability for the attractor 202 and may allow sensing elements 218a, 218b positioned along the flexible support members to more effectively be used to detect the locations and/or magnitudes of inputs and/or feedback related to haptic outputs.

As shown in FIGS. 2A-2B, the reluctance haptic engine 200 may include two flexible support members 206a, 206b that are parallel to one another and separated by a gap. In various embodiments, the reluctance haptic engine 200 may include more or fewer flexible support members. In some cases, the reluctance haptic engine 200 may include one or more additional flexible support members that extend beneath the attractor 202 in a direction that is 90 degrees offset from the direction that the flexible support members 206a, 206b extend (e.g., 90 degrees offset from a direction from the first end portion 236a to the second end portion 236b). Said another way, the additional flexible support members may be rotated 90 degrees compared to the flexible support members 206a, 206b along a plane that is parallel to the top surface of the attractor 202.

As noted above, each flexible support members 206a, 206b may include one or more sensing elements (e.g., sensing elements 218a, 218b) that may be used to sense actuation based on measuring deflection and/or deformation of the flexible support members 206a, 206b. As noted above, the flexible support members 206a, 206b may deflect or deform in response to actuation of the reluctance haptic engine, for example by a user input and/or a reluctance force. The sensing elements 218a, 218b may include one or more sensors (e.g., strain sensors) positioned along each flexible support member and configured to output a signal that varies based on the deflection and/or deformation of the flexible support members.

The spatial parameters determined from the signals provided by the sensing elements 218a, 218b may be used to determine a location and/or magnitude (e.g., force measurement) of an input. In some cases, the signals provided by the sensing elements 218a, 218b may be used to determine characteristics of haptic outputs provided by the reluctance haptic engine 200, which may be used to adjust the haptic outputs by changing signal characteristics (e.g., frequency, amplitude, waveform, etc.) of the electrical current provided to the conduction loops 210.

In some cases, the sensing elements 218a, 218b may be positioned on opposite sides of the spacer 216. For example, as shown in FIG. 2B, the sensing element 218a may be positioned between the first end portion of the flexible support member 206a and the spacer 216, and the sensing element 218b may be positioned between the second end portion of the flexible support member 206a and the spacer 216. The sensing elements 218a, 218b may output different signals that may be compared to determine characteristics of an input or haptic output.

The attractor 202 may include wings 252 that extend from opposite sides of the attractor 202. The wings 252 may be configured to fit between the tabs 250 to allow the attractor 202 to depress past the tabs 250.

Figure 2C:
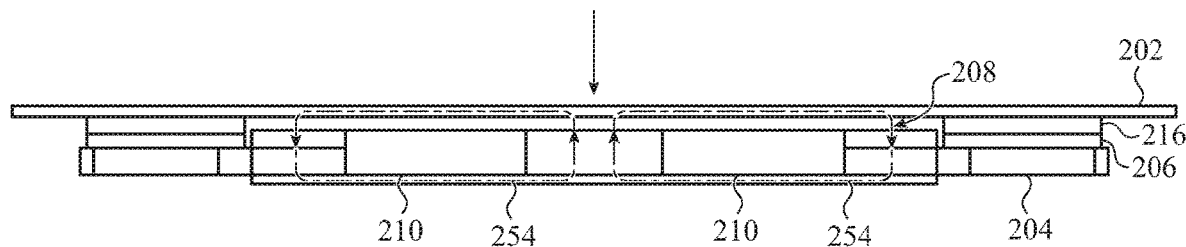
FIG. 2C illustrates a cross-section view of the reluctance haptic engine of FIG. 2A, taken through section line A-A of FIG. 2A.

FIG. 2C illustrates a cross-section view of the reluctance haptic engine 200, taken through section line A-A of FIG. 2A. As shown in FIG. 2C, the flexible support members 206a, 206b maintain a gap 208 between the attractor 202 and the core 204. As electrical current is applied to the conduction loops 210, magnetic flux (represented by lines 254) is generated, which produces a reluctance force that draws the attractor 202 toward the core 204, and actuating the reluctance haptic engine 200 by closing or reducing the gap 208.

Figure 2D:
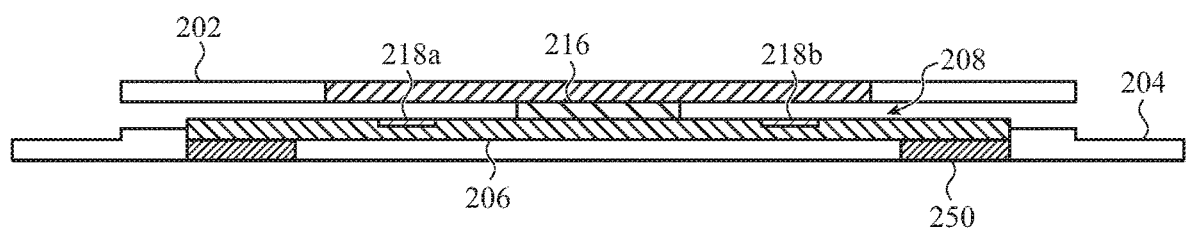
FIGS. 2D and 2E illustrate cross-section views of the reluctance haptic engine of FIG. 2A, taken through section line B-B of FIG. 2A.
Figure 2E:
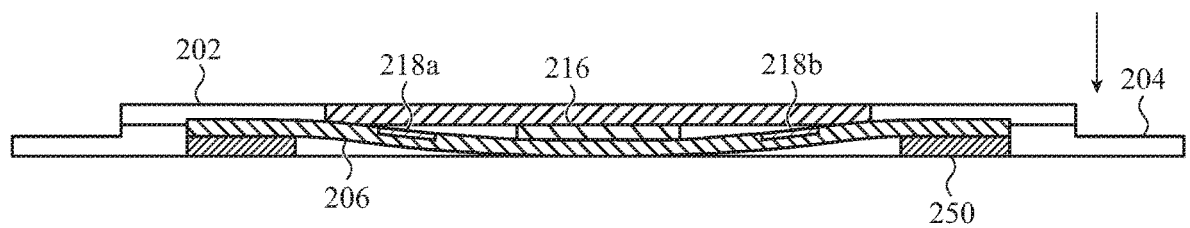

FIGS. 2D and 2E illustrate cross-section views of the reluctance haptic engine 200, taken through section line B-B of FIG. 2A. As shown in FIG. 2D, the flexible support members 206a, 206b may be attached or otherwise coupled to tabs 250 of the core 204. FIG. 2A shows the reluctance haptic engine 200 in an unactuated configuration in which the attractor 202 and the core 204 are spaced apart by a gap 208. The flexible support members 206a, 206b and spacers 216 may define the gap 208 between the attractor 202 and the core 204.

FIG. 2E shows the reluctance haptic engine 200 in an actuated configuration in which the gap 208 between the attractor 202 and the core 204 is reduced or eliminated. The reluctance haptic engine 200 may actuate (e.g., transition from an unactuated configuration to an actuated configuration) in response to a reluctance force generated within the reluctance haptic engine and/or in response to a force applied to the reluctance haptic engine, such as by a user input on the input structure 240. In some cases, the attractor 202 contacts the core 204 in an actuated configuration. In some cases, the attractor 202 does not contact the core 204 in an actuated configuration. Actuation of the reluctance haptic engine 200 may produce a haptic output or a portion thereof. The haptic output may be a localized haptic output along at least a portion of the input structure 140 and/or a global haptic output along a larger portion or a substantial entirety of the enclosure 122.

As noted above, the flexible support members 206a, 206b may deform as the reluctance haptic engine 200 actuates (e.g., as the attractor 202 moves toward the core 204). When the reluctance force is reduced or ceases (e.g., when the electrical currents applied to the conduction loops 210 are reduced or ceased) or when the input force is reduced or ceased, the biasing force of the flexible support members 206a, 206b may overcome the reluctance force and/or the input force and cause the biasing members to transition from a deformed state to the non-deformed state (or from a deformed state to a less-deformed state), thereby displacing the attractor 202 away from the core 204 and/or reestablishing the gap 208. Displacing the attractor 202 away from the core 204 may produce a haptic output or a portion thereof, similar to actuation of the reluctance haptic engine 100 discussed above.

Similar to the reluctance haptic engine 100, the flexible support members 206a, 206b may include one or more sensing elements that may be used to sense actuation based on measuring deflection and/or deformation of the flexible support members. As noted above, the flexible support members 206a, 206b may deflect or deform in response to actuation of the reluctance haptic engine, for example by a user input and/or a reluctance force. The sensing elements may include one or more sensors (e.g., strain sensors) positioned along the flexible support members 206a, 206b and configured to output a signal that varies based on the deflection and/or deformation of the flexible support members.

Figure 3A:
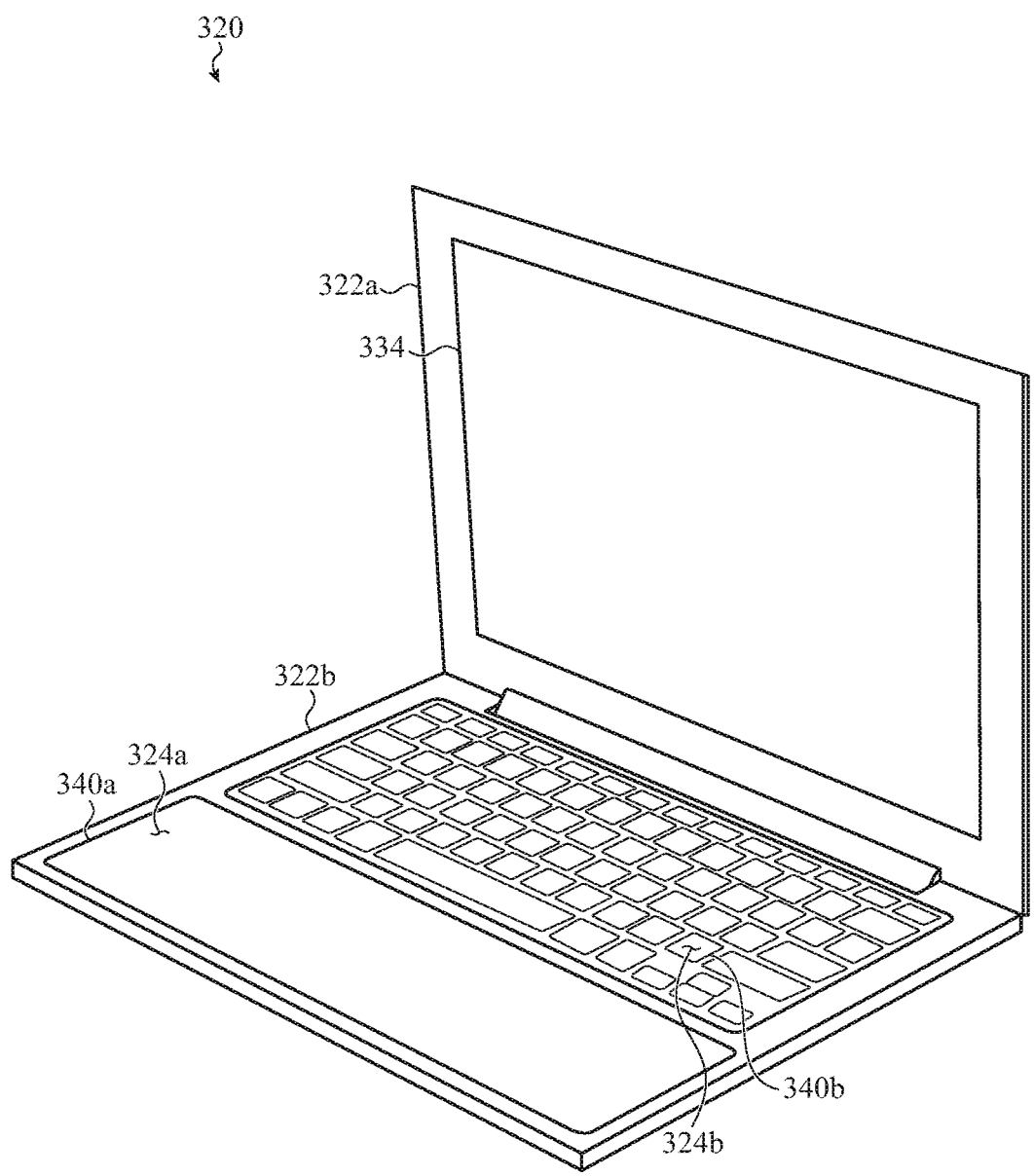
FIG. 3A illustrates an example electronic device that may incorporate a reluctance haptic engine with flexible support members, configured as a laptop.

FIG. 3A illustrates an example electronic device 320 that may incorporate a reluctance haptic engine with flexible support members, configured as a laptop. The laptop 320 is similar to the electronic devices discussed herein, and may include similar features and/or components, including an enclosure 322 comprising an upper portion 322a hingedly coupled to a lower portion 322b. A display 334 is located in the upper portion 322a of the enclosure 322. The electronic device 320 further includes input structures 340a and 340b, which define input surfaces 324a, 324b of the electronic device 320, respectively. In the example of FIG. 3A, the input structure 340a is implemented as a trackpad or trackpad cover, and the input structure 340b is implemented as a key or keycap of a keyboard.

Figure 3B:
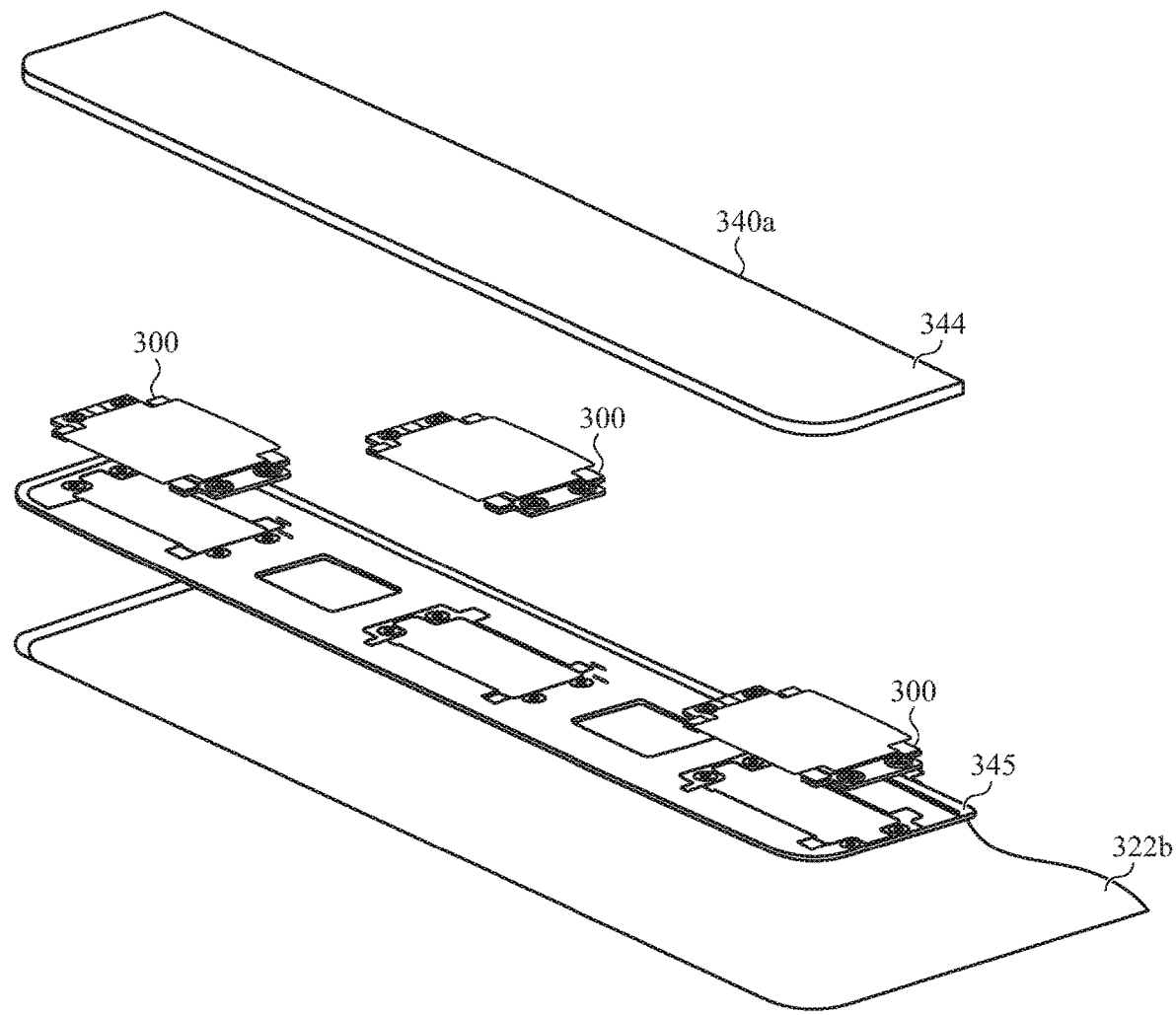
FIG. 3B illustrates an exploded view of a portion of the electronic device of FIG. 3A, showing reluctance haptic engines positioned beneath a trackpad.

FIG. 3B illustrates an exploded view of a portion of the electronic device 320, showing reluctance haptic engines 300 positioned beneath the trackpad 340a. The reluctance haptic engines 300 may be similar to other reluctance haptic engines discussed herein, and may include the same or similar features and functionality. The trackpad 340a may be positioned in an opening defined in the lower portion 322b of the enclosure. The electronic device 320 may include a frame 345 configured to couple the reluctance haptic engines 300 to the lower portion 322b of the enclosure. The trackpad 340a may include multiple layers, such as a cover layer (e.g., a glass cover layer) defining the input surface 324a, a touch-sensitive layer (e.g., a touch PCB) configured to detect locations and/or forces of inputs received on the input surface 324a, spacer layers, adhesive layers, and the like.

As shown in FIG. 3B, multiple reluctance haptic engine 300 may be positioned beneath the trackpad 340a. The reluctance haptic engines 300 may be used to provide localized haptic outputs at different locations along the input surface 324a, for example by bending or deflecting the trackpad 340a downward. The reluctance haptic engines 300 may additionally be used to sense inputs received at the trackpad 340a. For example, sensors positioned on the flexible support members of the haptic devices may be configured to detect the location and/or magnitude of one or more inputs to the trackpad 340a as well as to provide feedback regarding haptic outputs as discussed above.

Figure 4A:
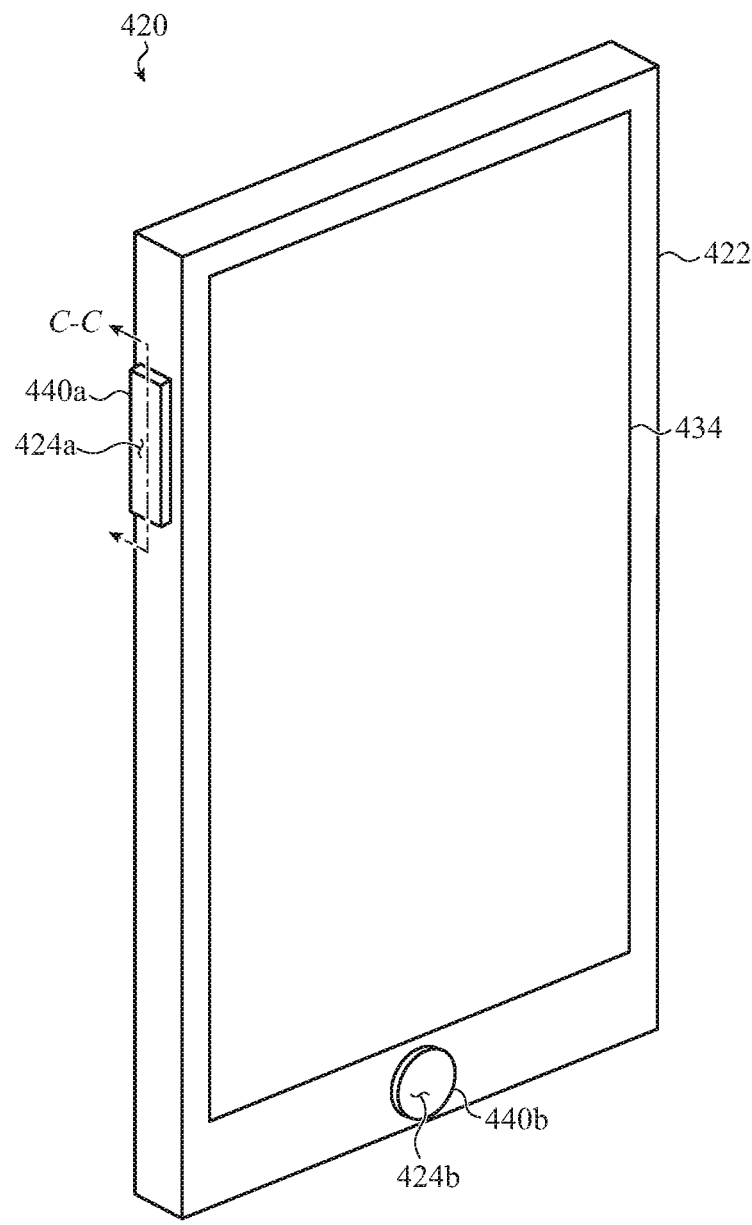
FIG. 4A illustrates an example electronic device that may incorporate a reluctance haptic engine with flexible support members.

FIG. 4A illustrates an example electronic device 420 that may incorporate a reluctance haptic engine with flexible support members. The electronic device 420 is a portable electronic device such as a smartphone, tablet, portable, media player, mobile device, or the like. The electronic device 420 includes an enclosure 422 at least partially surrounding a display 434, and one or more input structures 440a and 440b defining input surfaces 424a, 424b, respectively. The input structures 440a and 440b of the electronic device 420 may be similar to the input structures discussed herein and may include similar structure and/or functionality. The electronic device 420 can also include one or more internal components (not shown) typical of a computing or electronic device, such as, for example, one or more processing units, memory components, network interfaces, and so on.

The input structures 440a and 440b may be configured to control various functions and components of the electronic device 420, such as a graphical output of the display 434, an audio output, powering the electronic device on and off, and the like. An input structure 440a, 440b may be configured, for example, as a power button, a control button (e.g., volume control), a home button, or the like.

The enclosure 422 provides a device structure, defines an internal volume of the electronic device 420, and houses device components. In various embodiments, the enclosure 422 may be constructed from any suitable material, including metals (e.g., aluminum, titanium, and the like), polymers, ceramics (e.g., glass, sapphire), and the like. In one embodiment, the enclosure 422 is constructed from multiple materials. The enclosure 422 can form an external surface or partial external surface and protective case for the internal components of the electronic device 420, and may at least partially surround the display 434. The enclosure 422 can be formed of one or more components operably connected together, such as a front piece and a back piece. Alternatively, the enclosure 422 can be formed of a single piece operably connected to the display 434.

The display 434 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 434 provides a graphical output, for example associated with an operating system, user interface, and/or applications of the electronic device 420. In one embodiment, the display 434 includes one or more sensors and is configured as a touch-sensitive (e.g., single-touch, multi-touch) and/or force-sensitive display to receive inputs from a user. In various embodiments, a graphical output of the display 434 is responsive to inputs provided to the input structures 440a and 440b.

Figure 4B:
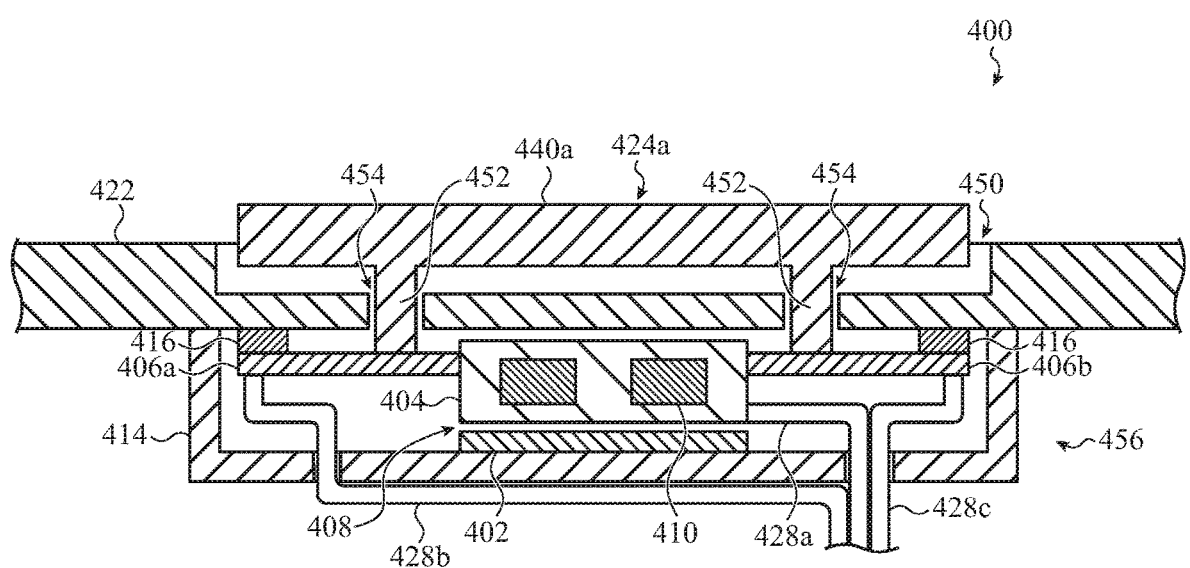
FIGS. 4B and 4C illustrate partial cross-section views of the electronic device of FIG. 4A showing an input structure and a reluctance haptic engine positioned beneath the input structure, taken through section line C-C of FIG. 4A.
Figure 4C:
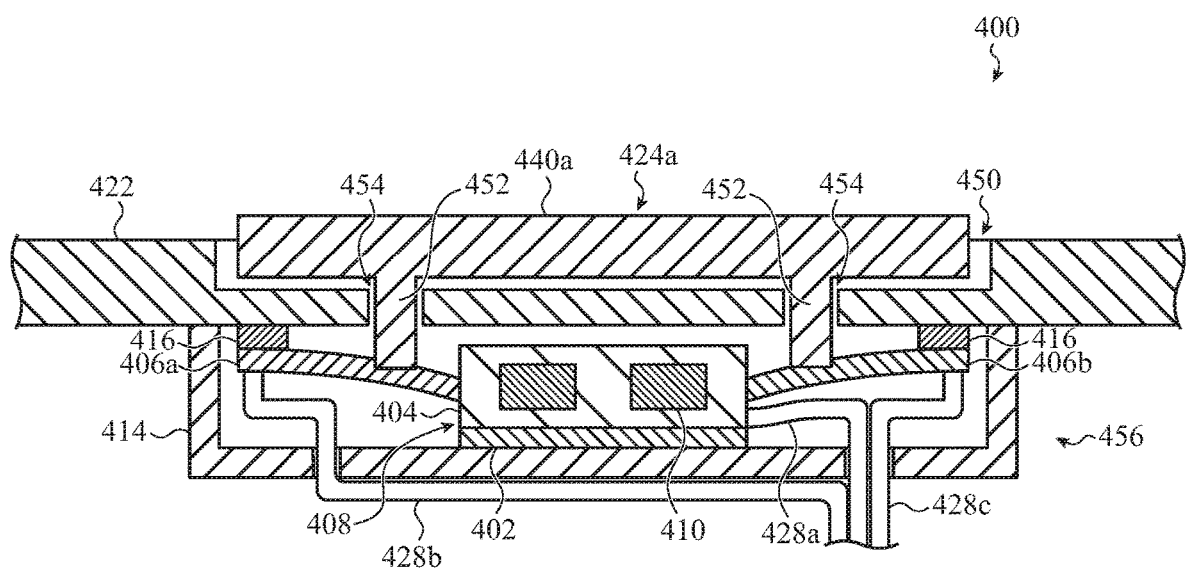

FIGS. 4B and 4C illustrate partial cross-section views of the electronic device 420 showing the input structure 440a and a reluctance haptic engine 400 positioned beneath the input structure, taken through section line C-C of FIG. 4A. The input structure 440a may be positioned in a recess 450 in the enclosure 422. The input structure 440a may include or be coupled to one or more shafts 452 extending through openings 454 into an interior volume 456 of the electronic device 420. The input structure 440a may be attached or otherwise coupled to a reluctance haptic engine 400 configured to provide haptic outputs and/or detect inputs at the input surface 424a of the input structure 440a. As shown in FIG. 4B, each of the shafts 452 may be attached or otherwise coupled to a flexible support member 406a, 406b to couple the input structure 440a to the reluctance haptic engine 400. The reluctance haptic engine 400 may include an attractor 402, a core 404, conduction loops 410, and the flexible support members 406a, 406b.

A first end of each flexible support member 406a, 406b may be attached or otherwise coupled to the enclosure 422 (e.g., by a spacer 416), the frame 414, or another component of the electronic device. A second end of each flexible support member 406a, 406b may be attached or otherwise coupled to a core 404 such that the core 404 is able to move relative to the enclosure 422, the frame 414, and/or the attractor 402. A first end portion of a first flexible support member 406a may be fixed with respect to (e.g., coupled or attached to) a first side of the core 404, and a first end portion of a second flexible support member 406b may be fixed with respect to (e.g., coupled or attached to) a second side of the core 404 that is opposite the first side, as shown in FIG. 4B. Second end portions of the first and second flexible support members 406a, 406b may be fixed with respect to (e.g., coupled or attached to) the enclosure. The input structure 440a may be coupled or attached to a middle portion of each flexible support member 406a, 406b, for example by the shafts 452.

Positioning the flexible support members 406a, 406b on opposite sides of the core may provide enhanced stability for the core 404 and/or the input structure 440a, and may allow sensing elements positioned along the flexible support members to more effectively be used to detect the locations and/or magnitudes of inputs and/or feedback related to haptic outputs.

The attractor 402 may be fixed with respect to the enclosure 422 such that the attractor 402 does not move with respect to the enclosure. The core 404 may be configured to move with respect to the attractor 402 and/or the enclosure 422. In some cases, the enclosure 422 may be coupled or otherwise attached to the frame 414 and/or another component that is fixed with respect to the enclosure 422.

FIG. 4B shows the reluctance haptic engine 400 in an unactuated configuration in which the attractor 402 and the core 404 are spaced apart by a gap 408. The flexible support members 406a, 406b and/or the spacers 416 may maintain the gap 408 between the attractor 402 and the core 404.

FIG. 4C shows the reluctance haptic engine 400 in an actuated configuration in which the gap 408 between the attractor 402 and the core 404 is reduced or eliminated. The reluctance haptic engine 400 may actuate (e.g., transition from an unactuated configuration to an actuated configuration) in response to a reluctance force generated within the reluctance haptic engine and/or in response to a force applied to the reluctance haptic engine, such as by a user input on the input structure 440a. As shown in FIGS. 4B and 4C, the attractor 402 may be fixed with respect to a frame 414 and/or the enclosure 422, and the core 404 may move toward the attractor 402 as the reluctance haptic engine 400 actuates. In some cases, the attractor 402 contacts the core 404 in an actuated configuration. In some cases, the attractor 402 does not contact the core 404 in an actuated configuration. Actuation of the reluctance haptic engine 400 may produce a haptic output or a portion thereof. The haptic output may be a localized haptic output along at least a portion of the input surface 424a of the input structure 440a and/or a global haptic output along a larger portion or a substantial entirety of the enclosure 422.

As noted above, the flexible support members 406a, 406b may deform as the reluctance haptic engine 400 actuates (e.g., as the core 404 moves toward the attractor 402). When the reluctance force is reduced or ceases (e.g., when the electrical currents applied to the conduction loops 410 are reduced or ceased) or when the input force is reduced or ceased, the biasing force of the flexible support members 406 may overcome the reluctance force and/or the input force and cause the biasing members to transition from a deformed state to the non-deformed state (or from a deformed state to a less-deformed state), thereby displacing the attractor 402 away from the core 404 and/or reestablishing the gap 408. Displacing the attractor 402 away from the core 404 may produce a haptic output or a portion thereof, similar to actuation of the reluctance haptic engines 100, 200 discussed above.

Similar to the reluctance haptic engine 100, the flexible support members 406a, 406b may include one or more sensing elements that may be used to sense actuation based on measuring deflection and/or deformation of the flexible support members. As noted above, the flexible support members 406a, 406b may deflect or deform in response to actuation of the reluctance haptic engine, for example by a user input and/or a reluctance force. The sensing elements may include one or more sensors (e.g., strain sensors) positioned along the flexible support members 406a, 406b and configured to output a signal that varies based on the deflection and/or deformation of the flexible support members.

The core 404 and/or the conduction loop 410 may be communicably coupled to a processing unit or other circuitry of the electronic device 420 via a connectors 428a. In some cases, the connector may be or include one or more traces in a flex or other cable. In some cases, multiple connectors may be incorporated into a single flex or cable.

The flexible support members 406a, 406b may be communicably coupled to a processing unit or other circuitry of the electronic device 420 via connectors 428b, 428c. In some cases, the connectors may be or include one or more traces in a flex or other cable. In some cases, multiple connectors may be incorporated into a single flex or cable.

Even though in FIGS. 4B and 4C the attractor 402 is shown as fixed with respect to the frame 414 and/or the enclosure 422 and the core 404 is shown as movable relative to the enclosure 422 and/or the frame 414, in various embodiments within the scope of this disclosure, the core 404 may be fixed relative to the frame 414 and/or the enclosure 422 and the attractor 402 may be movable relative to the frame 414 and/or the enclosure 422.

Figure 5A:
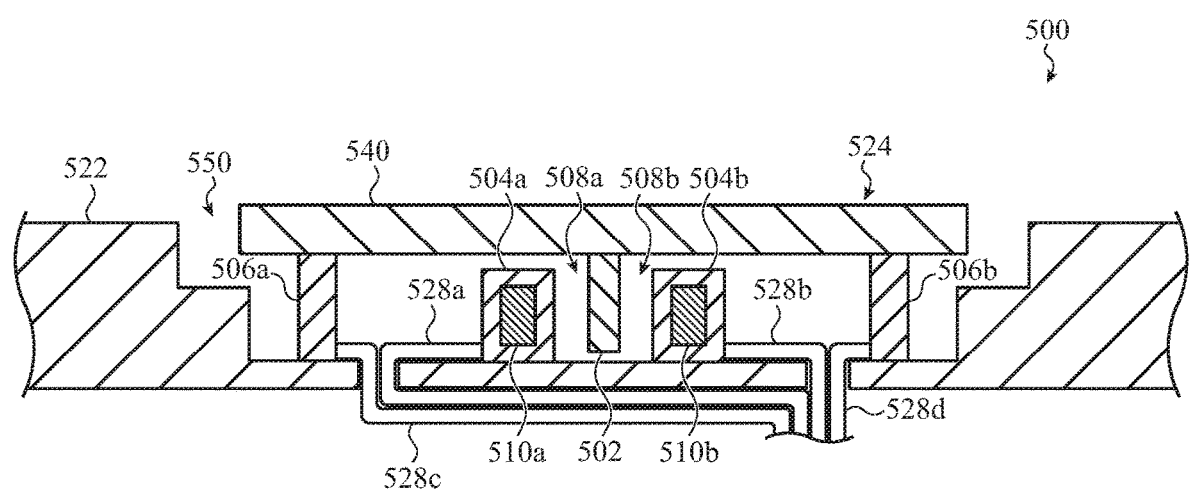
FIGS. 5A and 5B illustrate partial cross-section views of an electronic device with an example reluctance haptic engine with flexible support members configured to move an input structure laterally.
Figure 5B:
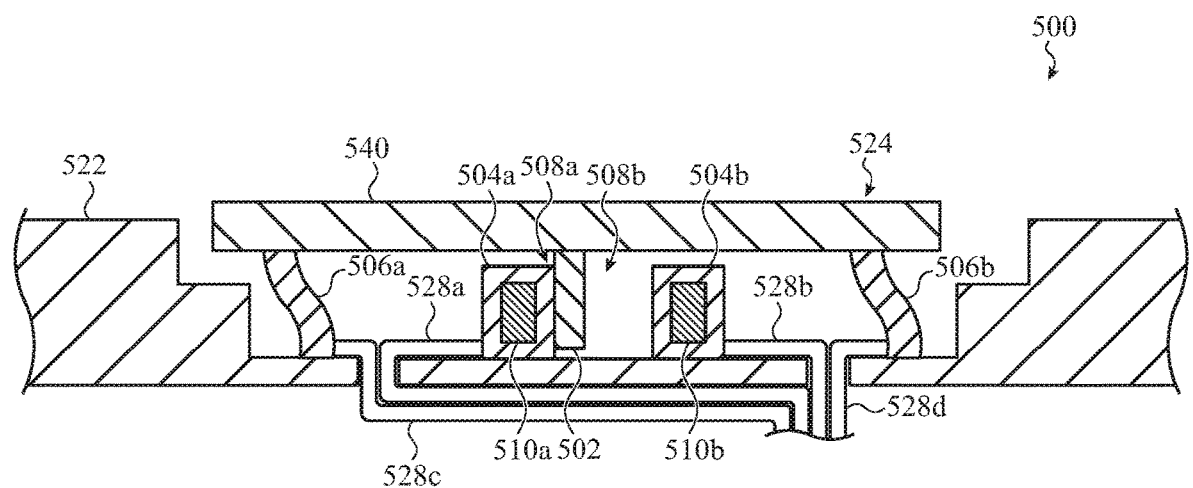

The reluctance haptic engine 400 of FIGS. 4B and 4C may translate the input structure 440a along a path that is perpendicular to the input surface (e.g., up and down with respect to FIGS. 4B and 4C). In various embodiments, reluctance haptic engines may be configured to move input structures in different directions or in multiple directions. For example, FIGS. 5A and 5B illustrate partial cross-section views of an electronic device with an example reluctance haptic engine 500 with flexible support members configured to translate an input structure 540 along a path that is parallel to an input surface 524 (e.g., left and right with respect to FIGS. 5A and 5B). The reluctance haptic engine 500 may be positioned beneath an input structure 540 defining the input surface 524 and positioned in a recess 550 in the enclosure 522 of an electronic device and/or at least partially within an interior volume of the electronic device. The attractor 502 may be attached or otherwise coupled to the input structure 540. The attractor 502 may be positioned laterally adjacent to one or more cores 504a, 504b such that attraction between the attractor and the core(s) causes lateral (e.g., left-to-right or right-to-left) movement of the attractor and the input structure 540. In some cases, the attractor 502 is positioned between two cores 504a and 504b and separated therefrom by gaps 508a and 508b, respectively.

As shown in FIGS. 5A and 5B, the flexible support members 506a, 506b may attach or otherwise couple the input structure 540 to the enclosure 522. In some cases, the flexible support members 506a, 506b may attach or otherwise couple the input structure 540 to a frame or another component that is fixed with respect to the enclosure 522. As noted above, the flexible support members 506a, 506b may be formed of a compliant or bendable material that allows the relative movement between the attractor 502 and the cores 504a, 504b.

As shown in FIG. 5B, as electrical current is applied to the conduction loops 510a of the core 504a, magnetic flux is generated, which produces a reluctance force that causes the attractor 502 to move toward the core 504a, which closes or reduces the gap 508a and causes the input structure 540 to move laterally (e.g., to the left with respect to FIGS. 5A and 5B). Similarly, as electrical current is applied to the conduction loops 510b of the core 504b, magnetic flux is generated, which produces a reluctance force that causes the attractor 502 to move toward the core 504b, which closes or reduces the gap 508b and causes the input structure 540 to move laterally (e.g., to the right with respect to FIGS. 5A and 5B). The conduction loops 510a, 510b may be energized in a sequence that causes bi-directional movement of the input structure 540 (e.g., rightward and leftward with respect to FIGS. 5A and 5B).

In some cases, the attractor 502 contacts the core(s) 502a, 502b in the actuated configuration. As noted above, the flexible support members 506a, 506b may deform as the attractor moves left and/or right. When the electrical signals are removed or reduced, the flexible support members 506a, 506b may cause the input structure 540 to return to the position shown in FIG. 5A to reestablish the gaps 508a, 508b.

The cores 504a, 504b and/or the conduction loops 510a, 510b may be communicably coupled to a processing unit or other circuitry of the electronic device via a connectors 528a, 528b. In some cases, the connectors may be or include one or more traces in a flex or other cable. In some cases, multiple connectors may be incorporated into a single flex or cable.

As noted above, the flexible support members 506a, 506b may include one or more sensing elements configured to determine the position, displacement, velocity, acceleration and other spatial parameters of the input structure 540a. The determined spatial parameters may be used, for example by a processing unit of the electronic device 520 to determine locations and/or forces of inputs to the input structure 540, as well as to provide feedback regarding haptic outputs as discussed above. The flexible support members 506a, 506b may be communicably coupled to a processing unit or other circuitry of the electronic device 520 via connectors 528c, 528d. In some cases, the connectors may be or include one or more traces in a flex or other cable. In some cases, multiple connectors may be incorporated into a single flex or cable.

In FIGS. 5A and 5B, the attractor 502 is shown as fixed with respect to the input structure 540 and the cores 504a, 504b is shown as fixed relative to the enclosure. However, in various embodiments within the scope of this disclosure, the cores 504a, 504b may be fixed relative to the input structure 540 and the attractor 502 may be fixed relative to the enclosure 522.

The reluctance haptic engine 400 of FIGS. 4B and 4C is configured to move the input structure 440a up and down with respect to FIGS. 4B and 4C, or in and out with respect to the surface of the enclosure 422. The reluctance haptic engine 500 of FIGS. 5A and 5B is configured to move the input structure 540 left and right with respect to FIGS. 5A and 5B. In various embodiments, reluctance haptic engines may be configured to move input structures in different directions or in multiple directions. A reluctance haptic engine 500 may include multiple coils and/or actuators configured to move an input structure in multiple directions. For example, any number of the embodiments shown in FIGS. 1A-5B may be combined to move an input surface laterally and/or in and out with respect to an enclosure.

Figure 6:
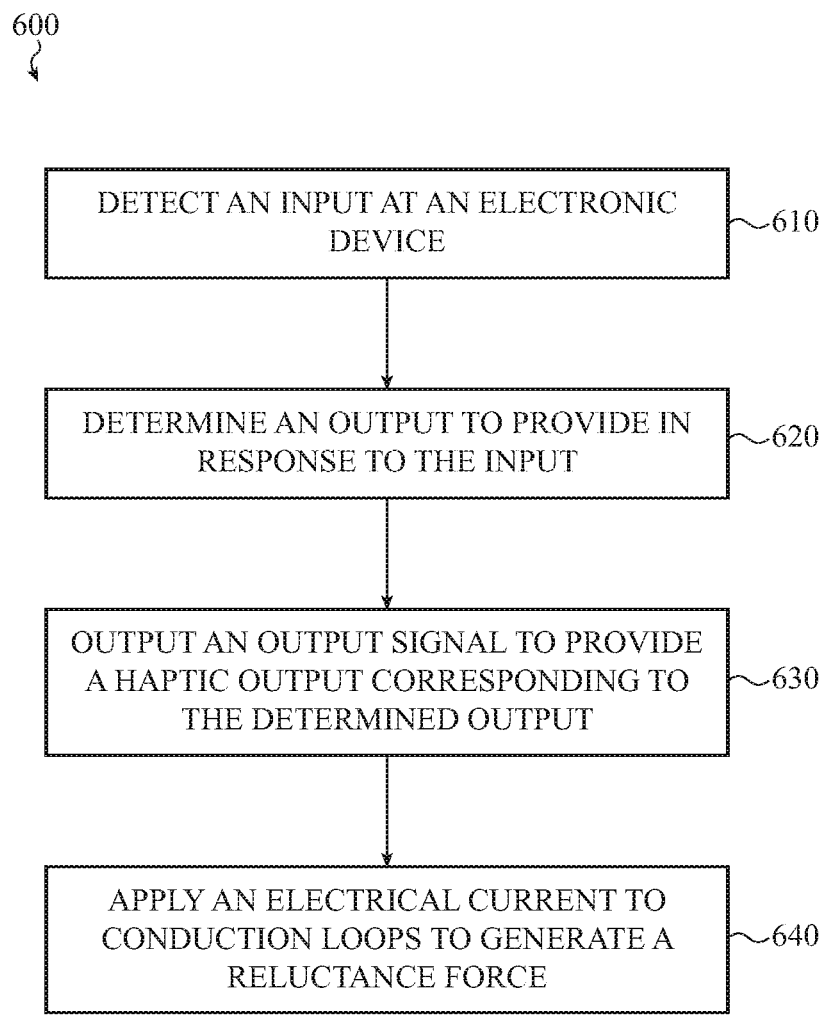
FIG. 6 illustrates a flowchart of an example method for producing a haptic output at an electronic device using a reluctance haptic engine with flexible support members.

FIG. 6 illustrates a flowchart of an example method 600 for producing a haptic output at an electronic device using a reluctance haptic engine with flexible support members. At block 610, the electronic device detects an input at the electronic device. For example, the input may be an input to a button or other input structure. As another example, the input may be a rotational input at a crown detected by sensing rotational movement of the crown. As still another example, the input may be a touch input detected along a touch-sensitive display. In some cases, the processing unit may determine whether the input exceeds a threshold level of movement (e.g., a threshold level of rotational movement, a threshold level of translation, etc.) In some cases, the method only proceeds if the input exceeds the threshold level of movement.

At block 620, the processing unit determines an output to be produced by the electronic device in response to the input received at block 610. In some cases, the output is determined in response to detecting the input at block 610. In some cases, the output corresponds to one or more characteristics of the input detected at block 610. For example, the output may correspond to a force of the input, a location of the input, a rotational speed or position of the crown, an output associated with a rotational input, a user interface command associated with the user input, or the like. The processing unit may determine one or more characteristics of the input.

In some cases, determining the output at block 620 may include determining a strength, length, or other characteristics of a haptic output to be produced. For example, the processing unit may determine whether to provide a localized haptic output or a global haptic output based, at least in part, on a characteristic of the input.

At block 630, the processing unit outputs an output signal to provide a haptic output that corresponds to the output determined at block 620. The output signal may be transmitted to a reluctance haptic engine of the electronic device to direct the reluctance haptic engine to produce the haptic output.

At block 640, in response to receiving the output signal from the processing unit, the electronic device applies electrical current to conduction loops of a reluctance haptic engine to cause the reluctance haptic engine to actuate (e.g., move from an unactuated configuration to an actuated configuration). In some cases, actuation of one or more reluctance haptic engines produces a first portion of the haptic output, for example by causing an input structure to move. As noted above, a gap between an attractor and a core of the reluctance haptic engine may be reduced or closed (e.g., the attractor may move toward the core and/or the core may move toward the attractor), thereby moving an input structure coupled to the attractor or the core (e.g., along a path that is parallel to an input surface of the input structure, along a path that is perpendicular to the input surface, or along a different path).

In some cases, following actuation of the reluctance haptic engine, the electrical current may be ceased, reduced, or otherwise changed, which causes the reluctance haptic engine to be restored (either partially or fully) to its initial configuration (e.g., to reestablish a gap between an attractor and one or more cores). As noted above, a gap between an attractor and a core of the reluctance haptic engine may be increased or restored (e.g., the attractor may move away from the core and/or the core may move away from the attractor), thereby moving an input structure coupled to the attractor or the core (e.g., along a path that is parallel to an input surface of the input structure, along a path that is perpendicular to the input surface, or along a different path).

In some cases, one or more reluctance haptic engines being restored produces a second portion of the haptic output, for example by causing the input structure to move. As noted above, in some cases, flexible support members of the reluctance haptic engine at least partially causes the restoration of the reluctance haptic engine, for example by applying a biasing force to move the attractor and/or the core(s) to an initial position.

In some cases, the reluctance haptic engine being restored may prepare the reluctance haptic engine for a subsequent actuation. In various embodiments, once the reluctance haptic engine has been restored (either partially or fully), it may be subsequently actuated by applying additional electrical current to the conduction loops (e.g., in response to receiving another output signal from the processing unit) to provide a third portion of the haptic output. The reluctance haptic engine may be subsequently restored (either partially or fully) to its initial configuration (either partially or fully), which may provide a fourth portion of the haptic output. Actuation and restoration may be repeated to repeatedly move the input structure in alternating directions to produce one or more haptic outputs and/or portions thereof.

The method 600 is an example method for providing haptic outputs and is not meant to be limiting. Methods for providing haptic outputs may omit and/or add steps to the method 600. Similarly, steps of the method 600 may be performed in different orders than the example order discussed above. The method 600 refers to providing haptic outputs in response to an input, but this is just one example. Haptic outputs may also be provided in response to a system state, an application operation on a device, a device state (e.g., temperature), application or system alerts (e.g., calendar alerts, notifications, alarms, and the like), incoming communications, push notifications, and so on.

Figure 7:
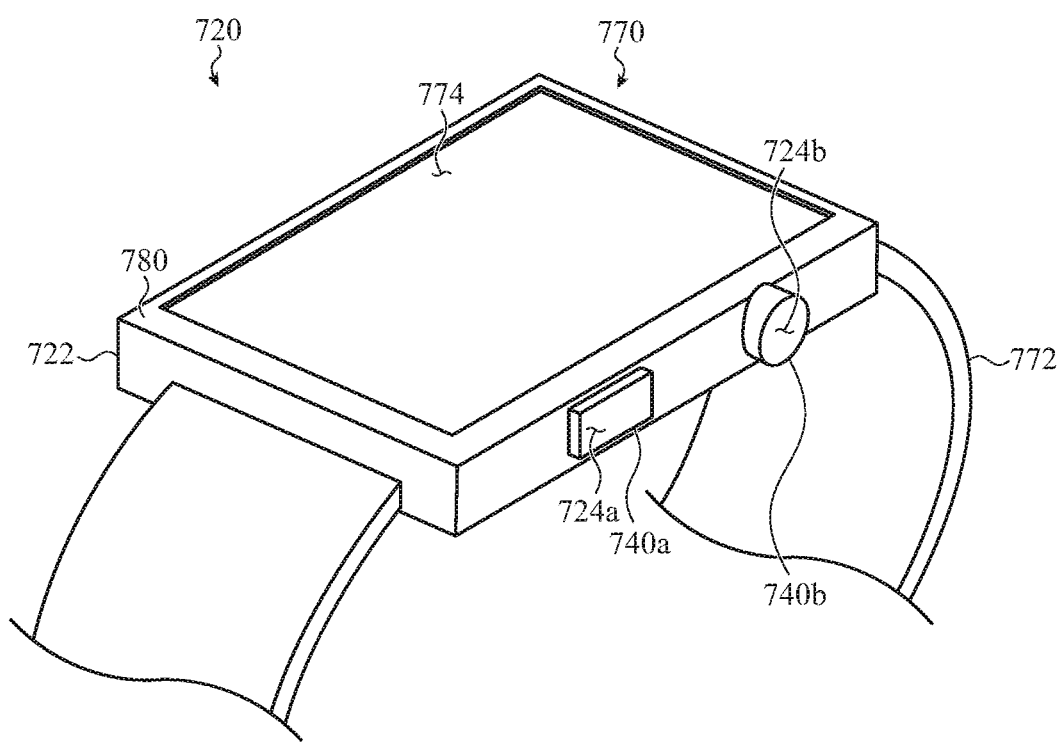
FIG. 7 illustrates an example electronic device that may incorporate a reluctance haptic engine with flexible support members, configured as an electronic watch.

FIG. 7 illustrates an example electronic device 720 that may incorporate a reluctance haptic engine with flexible support members, configured as an electronic watch. The electronic watch 720 is similar to the electronic devices discussed herein, and may include similar features and/or components, including a device enclosure 722, one or more input structures 740a, 740b, one or more output devices, a display positioned beneath the cover 774, and a processing unit positioned at least partially within the enclosure 722.

In some cases, the electronic device 720 includes a crown 740b configured to receive translational inputs, rotational inputs, and/or touch inputs. Inputs received at the crown 740b may result in changes in outputs provided by the electronic device 720 such as a graphical output of the display, and/or otherwise modify operations of the electronic device. In some cases, the crown 740b may be positioned along a side of the enclosure 722, and may extend through an opening defined in the enclosure. The crown 740b may include a user-rotatable crown body and a shaft. The crown body may be positioned at least partially outside of the device enclosure 722 and may be coupled to the shaft. In some cases, the shaft extends from the crown body and extends through the opening defined in the enclosure.

In some cases, the electronic watch 720 may include a conductive portion that may be used to perform an ECG measurement. The crown body or another input structure may define a conductive surface for receiving touch inputs. In some cases, the conductive surface functions as an electrode to sense voltages or signals indicative of one or more touch inputs and/or biological parameters, such as an electrocardiogram, of a user in contact with the conductive surface. The enclosure 722 may define a touch-sensitive or conductive surface that is electrically coupled to the processing unit and also functions as an electrode. The processing unit may determine an electrocardiogram using outputs of the electrodes of the crown body and the enclosure 722. In various embodiments, the crown 740b is electrically isolated from the enclosure 722, for example to allow separate measurements at the electrodes. In various embodiments, the crown body may be electrically coupled to the processing unit or another circuit of the electronic device 720, for example via a connector and/or the shaft.

Figure 8:
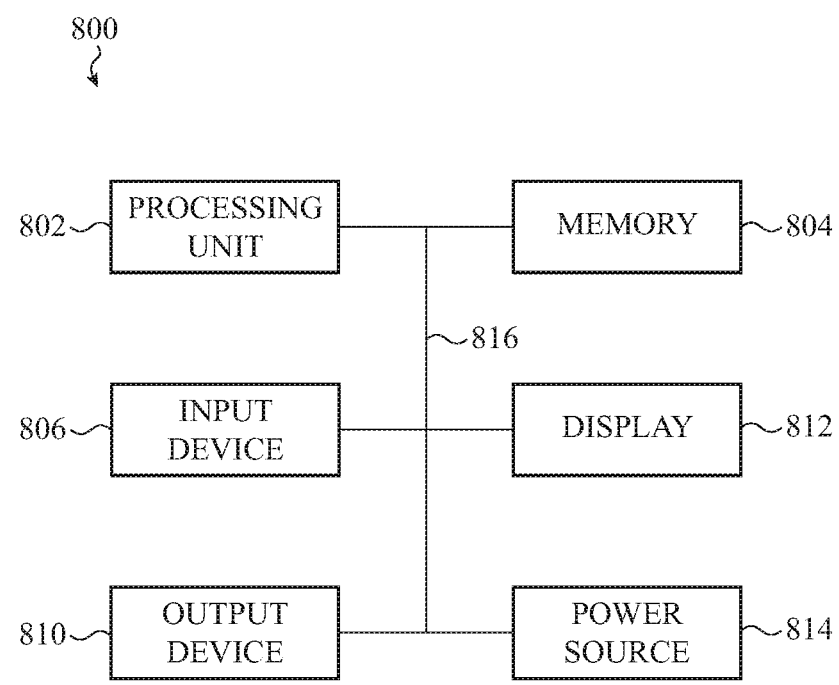
FIG. 8 illustrates a sample electrical block diagram of an electronic device that may incorporate a reluctance haptic engine.

FIG. 8 illustrates a sample electrical block diagram of an electronic device 800 that may incorporate a reluctance haptic engine. The electronic device may in some cases take the form of any of the electronic devices described with reference to FIGS. 1A-7, or other portable or wearable electronic devices. The electronic device 800 can include a display 812 (e.g., a light-emitting display), a processing unit 802, a power source 814, a memory 804 or storage device, an input device 806 (e.g., a crown, a button), and an output device 810 (e.g., a reluctance haptic engine).

The processing unit 802 can control some or all of the operations of the electronic device 800. The processing unit 802 can communicate, either directly or indirectly, with some or all of the components of the electronic device 800. For example, a system bus or other communication mechanism 816 can provide communication between the processing unit 802, the power source 814, the memory 804, the input device(s) 806, and the output device(s) 810.

The processing unit 802 can be implemented as any electronic device capable of processing, receiving, or transmitting data or instructions. For example, the processing unit 802 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 800 can be controlled by multiple processing units. For example, select components of the electronic device 800 (e.g., an input device 806) may be controlled by a first processing unit and other components of the electronic device 800 (e.g., the display 812) may be controlled by a second processing unit, where the first and second processing units may or may not be in communication with each other. In some cases, the processing unit 802 may determine a biological parameter of a user of the electronic device, such as an ECG for the user.

The power source 814 can be implemented with any device capable of providing energy to the electronic device 800. For example, the power source 814 may be one or more batteries or rechargeable batteries. Additionally or alternatively, the power source 814 can be a power connector or power cord that connects the electronic device 800 to another power source, such as a wall outlet.

The memory 804 can store electronic data that can be used by the electronic device 800. For example, the memory 804 can store electrical data or content such as, for example, audio and video files, documents and applications, device settings and user preferences, timing signals, control signals, and data structures or databases. The memory 804 can be configured as any type of memory. By way of example only, the memory 804 can be implemented as random access memory, read-only memory, Flash memory, removable memory, other types of storage elements, or combinations of such devices.

In various embodiments, the display 812 provides a graphical output, for example associated with an operating system, user interface, and/or applications of the electronic device 800. In one embodiment, the display 812 includes one or more sensors and is configured as a touch-sensitive (e.g., single-touch, multi-touch) and/or force-sensitive display to receive inputs from a user. For example, the display 812 may be integrated with a touch sensor (e.g., a capacitive touch sensor) and/or a force sensor to provide a touch-and/or force-sensitive display. The display 812 is operably coupled to the processing unit 802 of the electronic device 800.

The display 812 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 812 is positioned beneath and viewable through a cover that forms at least a portion of an enclosure of the electronic device 800.

In various embodiments, the input devices 806 may include any suitable components for detecting inputs. Examples of input devices 806 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 806 may be configured to detect one or more particular types of input and provide a signal (e.g., an input signal) corresponding to the detected input. The signal may be provided, for example, to the processing unit 802.

As discussed above, in some cases, the input device(s) 806 include a touch sensor (e.g., a capacitive touch sensor) integrated with the display 812 to provide a touch-sensitive display. Similarly, in some cases, the input device(s) 806 include a force sensor (e.g., a capacitive force sensor) integrated with the display 812 to provide a force-sensitive display.

The output devices 810 may include any suitable components for providing outputs. Examples of output devices 810 include audio output devices (e.g., speakers), visual output devices (e.g., lights or displays), tactile output devices (e.g., haptic output devices), communication devices (e.g., wired or wireless communication devices), and so on, or some combination thereof. Each output device 810 may be configured to receive one or more signals (e.g., an output signal provided by the processing unit 802) and provide an output corresponding to the signal.

In some cases, input devices 806 and output devices 810 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 802 may be operably coupled to the input devices 806 and the output devices 810. The processing unit 802 may be adapted to exchange signals with the input devices 806 and the output devices 810. For example, the processing unit 802 may receive an input signal from an input device 806 that corresponds to an input detected by the input device 806. The processing unit 802 may interpret the received input signal to determine whether to provide and/or change one or more outputs in response to the input signal. The processing unit 802 may then send an output signal to one or more of the output devices 810, to provide and/or change outputs as appropriate.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   an enclosure;
   an input structure defining an input surface;
   a reluctance haptic engine positioned beneath the input surface, and comprising:
   an attractor;
   a core separated from the attractor by a gap in an unactuated configuration of the reluctance haptic engine, the core comprising a conduction loop configured to receive an electrical current to generate a reluctance force that causes a transition from the unactuated configuration to an actuated configuration by reducing the gap between the attractor and the core;
a first flexible support member positioned on a first side of the core and coupled to the attractor and the core, the first flexible support member comprising a sensing element configured to generate a sensing signal; and
a second flexible support member positioned on a second side of the core opposite the first side of the core, the first flexible support member and the second flexible support member configured to:
in the unactuated configuration, maintain the gap between the core and the attractor; and
during the transition from the unactuated configuration to the actuated configuration of the reluctance haptic engine, deform as the gap between the attractor and the core is reduced; and
a processing unit configured to:
detect an input received at the input surface using the sensing signal generated by the sensing element; and
cause the electrical current to be applied to the conduction loop to produce a haptic output at the input surface.

2. The electronic device of claim 1, wherein:
the attractor is coupled to the input structure;
the attractor is configured to move toward the core as the gap is reduced, thereby displacing at least a portion of the input surface towards the core to produce the haptic output;
the core further comprises:
first and second tabs extending from the first side of the core; and
third and fourth tabs extending from the second side of the core;
the first flexible support member extends between the first and second tabs;
the second flexible support member extends between the third and fourth tabs.

3. The electronic device of claim 2, wherein:
a first end portion of the first flexible support member is attached to the first tab;
a second end portion of the first flexible support member is attached to the second tab;
a third end portion of the second flexible support member is attached to the third tab;
a fourth end portion of the second flexible support member is attached to the fourth tab;
the first flexible support member is coupled to the attractor by a first spacer attached to the first flexible support member between the first end portion and the second end portion; and
the second flexible support member is coupled to the attractor by a second spacer attached to the second flexible support member between the third end portion and the fourth end portion.

4. The electronic device of claim 3, wherein:
a first middle portion of the first flexible support member between the first end portion and the second end portion is configured to deform as the gap between the attractor and the core is reduced; and
a second middle portion of the second flexible support member between the first end portion and the second end portion is configured to deform as the gap between the attractor and the core is reduced.

5. The electronic device of claim 1, wherein:
the attractor is fixed with respect to the enclosure;
the core is configured to move relative to the attractor and the enclosure;
a first end portion of the first flexible support member is fixed with respect to the enclosure;
a second end portion of the first flexible support member is fixed with respect to the core; and
the input structure is coupled to a middle portion of the first flexible support member between the first end portion and the second end portion.

6. The electronic device of claim 5, wherein:
the input structure comprises a shaft extending through an opening defined in the enclosure; and
the shaft is attached to the middle portion of the first flexible support member.

7. The electronic device of claim 1, wherein:
the sensing element is a first sensing element;
the sensing signal is a first sensing signal;
the second flexible support member comprises a second sensing element configured to generate a second sensing signal; and
the processing unit is configured to detect the input received at the input surface using the first sensing signal and the second sensing signal.

8. The electronic device of claim 7, wherein the first and second sensing elements comprise strain sensors.

9. The electronic device of claim 1, wherein the haptic output is produced in response to the input received at the input surface.

10. The electronic device of claim 1, wherein producing the haptic output comprises translating the input structure along either:
a path that is parallel to the input surface; or
a path that is perpendicular to the input surface.

11. An electronic device comprising:
an enclosure;
a processing unit;
a display positioned at least partially within the enclosure; and
a reluctance haptic engine positioned within the enclosure and comprising:
a core comprising a conduction loop that is operably coupled to the processing unit;
an attractor configured to:
move toward the core in response to a reluctance force generated by an electrical current in the conduction loop; and
move away from the core in response to the electrical current in the conduction loop being ceased; and
a flexible support member coupling the attractor to the core and comprising a sensing element operably coupled to the processing unit, the flexible support member configured to:
provide a biasing force to maintain a gap between the attractor and the core in an absence of the electrical current in the conduction loop;
deform to allow the attractor to move toward the core in response to the reluctance force generated by the electrical current in the conduction loop; and
provide the biasing force to cause the attractor to move away from the core in response to the electrical current in the conduction loop being ceased, wherein:
the attractor moving toward the core produces a first portion of a haptic output along an external surface of the electronic device;

the attractor moving away from the core produces a second portion of the haptic output along the external surface of the electronic device the sensing element is configured to output a signal that varies based on the deformation of the flexible support member; and the processing unit is configured to determine a characteristic of the haptic output using the signal.

12. The electronic device of claim 11, wherein:

the processing unit is further configured to:

adjust the haptic output by changing a signal characteristic of the electrical current in the conduction loop based on the characteristic of the haptic output.

13. The electronic device of claim 11, wherein the characteristic is at least one of a position, displacement, velocity, or acceleration of the attractor.

14. The electronic device of claim 11, wherein:

the electronic device comprises an input structure defining an input surface; and the reluctance haptic engine is positioned beneath the input structure and configured to produce haptic outputs at the input surface.

15. The electronic device of claim 14, wherein:

the electronic device is a laptop;

the reluctance haptic engine is a first reluctance haptic engine positioned beneath a trackpad of the laptop;

the laptop further comprises a second reluctance haptic engine positioned beneath the trackpad of the laptop; and the first and second reluctance haptic engines are configured to produce localized haptic outputs at the trackpad.

16. A method comprising:

detecting an input at an electronic device comprising a reluctance haptic engine with a flexible support member, detecting the input comprising detecting a deformation of the flexible support member;

in response to the input, determining, by a processing unit of the electronic device, an output to be produced by the electronic device;

outputting, by the processing unit, an output signal to provide a haptic output that corresponds to the determined output;

in response to the output signal, applying an electrical current to a conduction loop of the reluctance haptic engine to generate a reluctance force to reduce a gap between an attractor and a core; and reducing the electrical current to increase the gap between the attractor and the core using the flexible support member of the reluctance haptic engine; wherein:

reducing the gap produces a first portion of the haptic output; and increasing the gap produces a second portion of the haptic output.

17. The method of claim 16, wherein reducing the gap comprises overcoming a biasing force provided by the flexible support member.

18. The method of claim 16, wherein:

the electrical current is a first electrical current; and the method further comprises, after the gap is increased, reducing the gap by applying a second electrical current to the conduction loop to produce a third portion of the haptic output.

19. The method of claim 16, wherein:

the method further comprises displaying a graphical output using a touch-sensitive display; and detecting the input comprises detecting a touch input along the touch-sensitive display.

\* \* \* \* \*